US011528211B2

(12) United States Patent
Cheng et al.

(10) Patent No.: US 11,528,211 B2
(45) Date of Patent: Dec. 13, 2022

(54) DATA INSPECTION SYSTEM FOR INSPECTING OPERATING SITUATIONS OF MULTIPLE IOT DEVICES IN A PLURALITY OF TARGET IOT SYSTEMS

(71) Applicant: ACOM NETWORKS Technology Co., Ltd., Taipei (TW)

(72) Inventors: Tze Yi Cheng, Taipei (TW); Yu Sheng Ho, Taipei (TW); Yuan Yu Chen, Taipei (TW)

(73) Assignee: ACOM NETWORKS Technology Co., Ltd., Taipei (TW)

( * ) Notice: Subject to any disclaimer, the term of this patent is extended or adjusted under 35 U.S.C. 154(b) by 0 days.

(21) Appl. No.: 17/474,487

(22) Filed: Sep. 14, 2021

(65) Prior Publication Data

US 2022/0103454 A1 Mar. 31, 2022

Related U.S. Application Data

(60) Provisional application No. 63/085,299, filed on Sep. 30, 2020.

(30) Foreign Application Priority Data

Jul. 19, 2021 (TW) .................................. 110126497

(51) Int. Cl.
*H04L 12/00* (2006.01)
*H04L 43/50* (2022.01)
(Continued)

(52) U.S. Cl.
CPC ............ *H04L 43/50* (2013.01); *G06F 16/285* (2019.01); *H04L 43/0888* (2013.01)

(58) Field of Classification Search
CPC ... H04L 43/0888; H04L 43/50; H04L 67/125; H04L 63/1416; H04L 41/142;
(Continued)

(56) References Cited

U.S. PATENT DOCUMENTS

2015/0019553 A1* 1/2015 Shaashua ............... G06N 7/005
707/737
2016/0147506 A1* 5/2016 Britt ...................... H04L 67/125
717/107

(Continued)

OTHER PUBLICATIONS

Taiwanese Office Action and Search Report for Taiwanese Application No. 110126497, dated Apr. 25, 2022, with English translation.

(Continued)

*Primary Examiner* — Frantz Coby
(74) *Attorney, Agent, or Firm* — Birch, Stewart, Kolasch & Birch, LLP

(57) ABSTRACT

A data inspection system includes: a communication circuit arranged to operably communicate data with a plurality of attributes filtering devices to receive multiple activity records which are generated by the plurality of attributes filtering devices and corresponding to multiple IoT devices in a plurality of target IoT systems; a storage circuit arranged to operably store the multiple activity records received by the communication circuit; and a data classification circuit coupled with the storage circuit and arranged to operably classify each of the multiple activity records received by the communication circuit based on N attributes to form M data groups; wherein N is 2 or an integer greater than 2, while M is at least two times of N.

8 Claims, 12 Drawing Sheets

(51) Int. Cl.
*G06F 16/28* (2019.01)
*H04L 43/0888* (2022.01)

(58) Field of Classification Search
CPC ............ G06F 16/285; H04M 15/8214; H04M 15/765; G06N 7/005
USPC .................................................. 709/223–226
See application file for complete search history.

(56) References Cited

U.S. PATENT DOCUMENTS

| | | | |
|---|---|---|---|
| 2019/0098028 A1* | 3/2019 | Ektare | H04L 63/1416 |
| 2020/0028973 A1* | 1/2020 | Livanos | H04M 15/8214 |
| 2020/0412880 A1* | 12/2020 | Livanos | H04M 15/765 |
| 2022/0103442 A1* | 3/2022 | Cheng | H04L 41/142 |

OTHER PUBLICATIONS

Taiwanese Office Action and Search Report for Taiwanese Application No. 110126498, dated April 25, 2022, with English translation.

* cited by examiner

US 11,528,211 B2

DATA INSPECTION SYSTEM FOR INSPECTING OPERATING SITUATIONS OF MULTIPLE IOT DEVICES IN A PLURALITY OF TARGET IOT SYSTEMS

CROSS-REFERENCE TO RELATED APPLICATIONS

This application claims the benefit of priority to U.S. Provisional Application Ser. No. 63/085,299, filed on Sep. 30, 2020; the entirety of which is incorporated herein by reference for all purposes.

This application claims the benefit of priority to patent application Ser. No. 11/012,6497, filed in Taiwan on Jul. 19, 2021; the entirety of which is incorporated herein by reference for all purposes.

BACKGROUND

The disclosure generally relates to internet of things (IoT), and, more particularly, to a data inspection system for inspecting operating situations of multiple IoT devices in a plurality of target IoT systems.

As the technology developed, related applications of various mIoT (massive Internets of Things) has become more and more popular. In many mIoT applications, telecommunications networks, mobile communication networks, Internet, or various wireless communication mechanisms are usually adopted to transmit relevant operation data of numerous IoT terminal devices deployed in different locations to a remote data center for aggregation and analysis. In other words, between the numerous IoT terminal devices and the data center, it requires various communication infrastructures to serve as the medium for data transmission.

If there are problems with some IoT terminal devices or some parts in the communication infrastructure, the analysis results of the data center will be biased. Therefore, if abnormal conditions cannot be detected quickly, it is difficult to determine the root cause of the problems in the massive IoT applications, and it will also greatly reduce the overall system performance and application value of massive IoT applications.

SUMMARY

An example embodiment of a data inspection system of an IoT operations monitoring system is disclosed. The data inspection system is utilized for inspecting operating situations of multiple IoT devices in a plurality of target IoT systems. The data inspection system comprises: a communication circuit, arranged to operably communicate data with a plurality of attributes filtering devices through networks to receive multiple activity records corresponding to the multiple IoT devices and generated by the plurality of attributes filtering devices; a storage circuit, arranged to operably store the multiple activity records received by the communication circuit; and a data classification circuit, coupled with the storage circuit, and arranged to operably classify each of the multiple activity records based on contents of N attributes to form M data groups, and to operably store the M data groups in the storage circuit; wherein N is 2 or an integer greater than 2, while M is at least two times of N.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
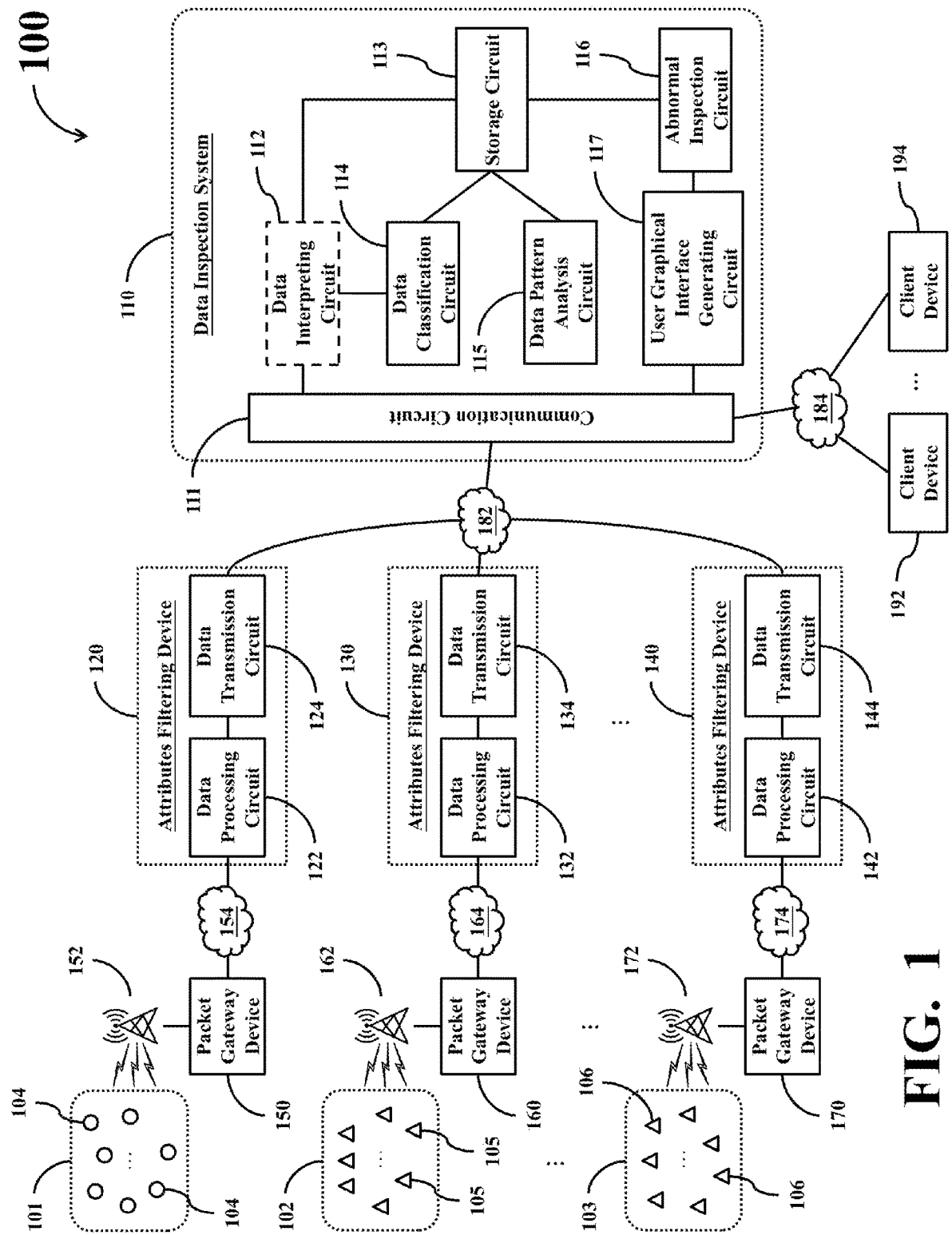
FIG. 1 shows a simplified functional block diagram of an IoT operations monitoring system according to one embodiment of the present disclosure.

FIG. 1 shows a simplified functional block diagram of an IoT operations monitoring system 100 according to one embodiment of the present disclosure. The IoT operations monitoring system 100 comprises a data inspection system 110 and a plurality of attributes filtering devices (e.g., the exemplary attributes filtering devices 120, 130, and 140 shown in FIG. 1). The IoT operations monitoring system 100 is utilized for monitoring operations of multiple IoT devices in a plurality of different target IoT systems (e.g., the exemplary target IoT systems 101, 102, and 103 shown in FIG. 1). As shown in FIG. 1, each of the target IoT systems comprises multiple IoT devices. For example, the target IoT system 101 comprises multiple IoT devices 104, the target IoT system 102 comprises multiple IoT devices 105, and the target IoT system 103 comprises multiple IoT devices 106.

The term "IoT operations monitoring system" used throughout the description and the claims refers to various IoT application systems utilizing multiple IoT devices which are respectively deployed in different locations to monitor, collect or to generate specific types of data so as to realize specific purposes, such as smart electricity meter systems, smart gas meter systems, smart street light systems, traffic signal management systems, logistics monitoring systems, smart manufacturing systems, remote health monitoring systems, infectious disease epidemic statistics systems, or the like.

The term "IoT device" used throughout the description and the claims refers to various electronic devices having the ability to detect, collect, or generate specific types of data, and capable of conducting data communications with neighboring base stations by adopting wireless access technologies, such as smart electricity meters, smart gas meters, smart street lights, traffic signal monitoring circuits, electronic tags in logistics monitoring systems, mobile communication devices in logistics monitoring systems, machine operation monitoring devices in smart manufacturing systems, wearable health monitoring devices, epidemic data receiving devices, or the like.

In practical applications, the aforementioned target IoT systems 101, 102, and 103 may have different applications, and different target IoT systems may have different quantity of IoT devices. Each of the target IoT systems 101, 102, and 103 may be an IoT system of various scales, and the quantity of IoT devices in respective target IoT systems may be a single-digit number, dozens, hundreds, or even more than one thousand. In other words, the target IoT systems 101, 102, and 103 may be a mIoT (massive Internet of Things) system of various types.

All of the IoT devices in an individual target IoT system may be arranged in a same geographical region (e.g., same building, block, street, town, city, or the like), or may be arranged in different geographical regions (e.g., different buildings, blocks, streets, towns, cities, or the like). In addition, individual IoT device may be arranged at a fixed venue, or may be arranged on moveable objects.

During the operation of the aforementioned target IoT systems 101, 102, and 103, individual IoT device may utilize RAT (Radio Access Technology) to directly connect to a neighboring base station to conduct various data communications, or indirectly connect to a neighboring base station through other communication equipments to conduct various data communications. The base station transmits the data transmitted from respective IoT device to the back-end IoT operations monitoring system 100 through relevant packet gateway devices for further processing and analysis. The aforementioned wireless access technologies may be various 2G (2nd Generation) mobile communication technologies, various 3G (3rd Generation) mobile communication technologies, various 4G (4th Generation) mobile communication technologies, various 5G (5th Generation) mobile communication technologies, various IoT communication technologies, various NB-IoT (Narrow Band Internet of Thing) communication technologies, various Vehicle-to-Vehicle communication technologies, various V2X (Vehicle-to-Everything) communication technologies, various satellite communication technologies, or various wireless communication technologies issued by other standard-setting organizations.

For example, in the embodiment of FIG. 1, each IoT device 104 in the target IoT system 101 may directly or indirectly connect to a base station 152 to conduct data communications, and the base station 152 transmits the data transmitted from the IoT device 104 to the back-end IoT operations monitoring system 100 through a packet gateway device 150 for further processing and analysis. Each IoT device 105 in the target IoT system 102 may directly or indirectly connect to a base station 162 to conduct data communications, and the base station 162 transmits the data transmitted from the IoT device 105 to the back-end IoT operations monitoring system 100 through a packet gateway device 160 for further processing and analysis. Each IoT device 106 in the target IoT system 103 may directly or indirectly connect to a base station 172 to conduct data communications, and the base station 172 transmits the data transmitted from the IoT device 106 to the back-end IoT operations monitoring system 100 through a packet gateway device 170 for further processing and analysis.

In other words, the aforementioned packet gateway devices 150-170 and base stations 152-172 collectively act as a data transmission bridge between the IoT operations monitoring system 100 and each of the target IoT systems 101, 102, and 103.

Please note that the quantity of the attributes filtering devices, the quantity of the target IoT systems, the quantity of the IoT devices in respective target IoT system, the quantity of the base stations, and the quantity of the packet gateway devices shown in FIG. 1 are merely an exemplary embodiment, rather than a restriction to the practical implementations. For example, in practical applications, there may exist multiple base stations and/or multiple packet gateway devices between each of the target IoT systems and the IoT operations monitoring system 100.

As shown in FIG. 1, the data inspection system 110 in the IoT operations monitoring system 100 comprises a communication circuit 111, a data interpreting circuit 112, a storage circuit 113, a data classification circuit 114, a data pattern analysis circuit 115, an abnormal inspection circuit 116, and a user graphical interface generating circuit 117. The attributes filtering device 120 comprises a data processing circuit 122 and a data transmission circuit 124. The attributes filtering device 130 comprises a data processing circuit 132 and a data transmission circuit 134. The attributes filtering device 140 comprises a data processing circuit 142 and a data transmission circuit 144.

Each of the attributes filtering devices 120, 130, and 140 is arranged to operably receive multiple packet messages corresponding to multiple IoT devices and generated by one or more packet gateway devices, and to operably generate multiple activity records respectively corresponding to the multiple IoT devices according to the received multiple packet messages. In practical applications, the multiple packet messages generated by each packet gateway device may correspond to different IoT devices in the same target IoT system, or may correspond to different IoT devices in multiple target IoT systems. In other words, the multiple packet messages received by each attributes filtering device may correspond to different IoT devices in the same target IoT system, or may correspond to different IoT devices in multiple target IoT systems.

For example, the attributes filtering device 120 may receive multiple packet messages corresponding to multiple IoT devices 104 and generated by one or more packet gateway devices 150 corresponding to the target IoT system 101 through the network 154, and may generate multiple activity records respectively corresponding to the multiple IoT devices 104 according to the received multiple packet messages. The attributes filtering device 130 may receive multiple packet messages corresponding to multiple IoT devices 105 and generated by one or more packet gateway devices 160 corresponding to the target IoT system 102 through the network 164, and may generate multiple activity records respectively corresponding to the multiple IoT devices 105 according to the received multiple packet messages. The attributes filtering device 140 may receive multiple packet messages corresponding to multiple IoT devices 106 and generated by one or more packet gateway devices 170 corresponding to the target IoT system 103 through the network 174, and may generate multiple activity records respectively corresponding to the multiple IoT devices 106 according to the received multiple packet messages.

In practice, each of the aforementioned networks 154, 164, and 174 may be realized with various private networks (e.g., an intranet of a telecommunication service vendor, or other dedicated communication networks, or the like), or may be realized with Internet.

The data inspection system 110 may inspect operations of multiple IoT devices in the target IoT systems 101, 102, and 103 according to the activity records generated by the attributes filtering devices 120, 130, and 140.

In the data inspection system 110, the communication circuit 111 is arranged to operably conduct data communications with the aforementioned attributes filtering devices 120, 130, and 140 through the network 182, so as to receive the multiple activity records generated by the attributes filtering devices 120, 130, and 140. The aforementioned network 182 may be realized with various private networks (e.g., an intranet of a telecommunication service vendor, or other dedicated communication networks, or the like), or may be realized with Internet.

The data interpreting circuit 112 is coupled with the communication circuit 111, and is arranged to operably interpret data received by the communication circuit 111 to acquire the aforementioned multiple activity records.

The storage circuit 113 is coupled with the communication circuit 111, and is arranged to operably store the activity records received by the communication circuit 111.

The data classification circuit 114 is coupled with the storage circuit 113, and is arranged to operably classify each of the multiple activity records based on contents of a certain quantity of attributes to form multiple data groups.

The data pattern analysis circuit 115 is coupled with the storage circuit 113, and is arranged to operably analyze the data pattern of a plurality of activity records in respective data groups with respect to a data collection period, so as to generate one or more reference data sets corresponding to the respective data groups, and to operably store the one or more generated reference data sets in the storage circuit 113.

The abnormal inspection circuit 116 is coupled with the storage circuit 113, and is arranged to operably inspect whether abnormal conditions occur in the operations of the multiple IoT devices in the aforementioned target IoT systems 101, 102, and 103 according to the reference data sets stored in the storage circuit 113, and to operably generate one or more corresponding warning messages when the abnormal condition occurs.

The user graphical interface generating circuit 117 is coupled with the communication circuit 111, the storage circuit 113, and the abnormal inspection circuit 116, and is arranged to operably display the warning messages generated by the abnormal inspection circuit 116 for the user by using appropriate visual approaches.

In the embodiment of FIG. 1, the data inspection system 110 may further receive relevant data of the multiple IoT devices in the target IoT system 101, 102, or 103 from other external devices.

For example, the operator, administrator, and/or other user of the target IoT system 101, 102, or 103 may sort the multiple IoT devices in the target IoT system 101, 102, or 103 into multiple sites based on their geographical locations, and may respectively assign different corresponding identification data (hereinafter referred to as site ID) to the IoT devices in different sites. The operator, administrator, and/or other user of the aforementioned target IoT system 101, 102, or 103 may utilize an appropriate client device (e.g., the exemplary client devices 192 and/or 194 shown in FIG. 1) to connect to the data inspection system 110 through the network 184, and to provide the site IDs corresponding to respective IoT devices in the target IoT system 101, 102, or 103 to the data inspection system 110. The aforementioned network 184 may be realized with Internet, or may be realized with various private networks (e.g., an intranet of a telecommunication service vendor, or other dedicated communication networks, or the like).

In this situation, the communication circuit 111 and the data interpreting circuit 112 receive and process the site IDs of respective IoT devices transmitted from the client devices 192 and/or 194, and store different site IDs corresponding to different IoT devices in the storage circuit 113.

In some embodiments, the operator, administrator, auditor and/or other user of the aforementioned target IoT system 101, 102, or 103 may further utilize an appropriate client device (e.g., the exemplary client device 192 or 194 shown in FIG. 1) to connect to the data inspection system 110 through the network 184 to inquire the operations of relevant target IoT systems, or to issue various controlling commands to the aforementioned target IoT system 101, 102, or 103 through the data inspection system 110. In this situation, the communication circuit 111 of the data inspection system 110 may conduct data communications with the client devices through the network 184 to provide the webpages or manipulation interfaces generated by the user graphical interface generating circuit 117 to the client devices, so that the operator, administrator, auditor and/or other user of the respective target IoT system may conduct relevant manipulation on the webpages or manipulation interfaces.

In practice, the communication circuit 111 may be realized with various wired transmission circuits, wireless transmission circuits, hybrid circuits integrating the aforementioned two communication mechanisms, or cloud communication systems.

The data interpreting circuit 112 may be realized with various packet demodulation circuits, digital computing circuits, micro-processors, combinations of micro-processors, ASICs (Application Specific Integrated Circuits), or cloud application modules having packet parsing capability. In practice, the data interpreting circuit 112 may be integrated into the communication circuit 111 or the data classification circuit 114.

Each of the data classification circuit 114, the data pattern analysis circuit 115, and the abnormal inspection circuit 116 may be realized with various single processor modules, combinations of multiple processor modules, single computer systems, combinations of multiple computer systems, single servers, combinations of multiple servers, or cloud computing systems having data computing capability.

The storage circuit 113 may be realized with various suitable non-volatile storage devices, database systems, or cloud storage systems.

The user graphical interface generating circuit 117 may be realized with various single processor modules, combinations of multiple processor modules, single image processing circuits, combinations of multiple image processing circuits, single computer systems, combinations of multiple computer systems, single servers, combinations of multiple servers, or cloud processing systems having image processing capabilities.

In practice, different functional blocks of the aforementioned data inspection system 110 may be realized with separate circuits or different cloud application modules, or may be integrated into a single server system or a single cloud computing system.

Each of the data processing circuits 122, 132, and 142 may be realized with various single computer systems, combinations of multiple computer systems, single servers, combinations of multiple servers, or cloud processing systems having data communication capabilities and data processing capabilities.

Each of the data transmission circuits 124, 134, and 144 may be realized with various wired transmission circuits, wireless transmission circuits, hybrid circuits integrating the aforementioned two communication mechanisms, or cloud communication systems.

In practice, different functional blocks of the aforementioned individual attributes filtering devices may be realized with separate circuits or different cloud application modules, or may be integrated into a single computer system, a single server system, or a single cloud computing system.

In addition, each of the aforementioned client devices 192 and 194 may be realized with a device that can be connected to the internet and capable of executing browser programs or related application programs to log in to the data inspection system 110 for further manipulations, such as a computer, a server, a mobile communication device (e.g., a smart phone, a wearable device), or other similar device.

Figure 2:
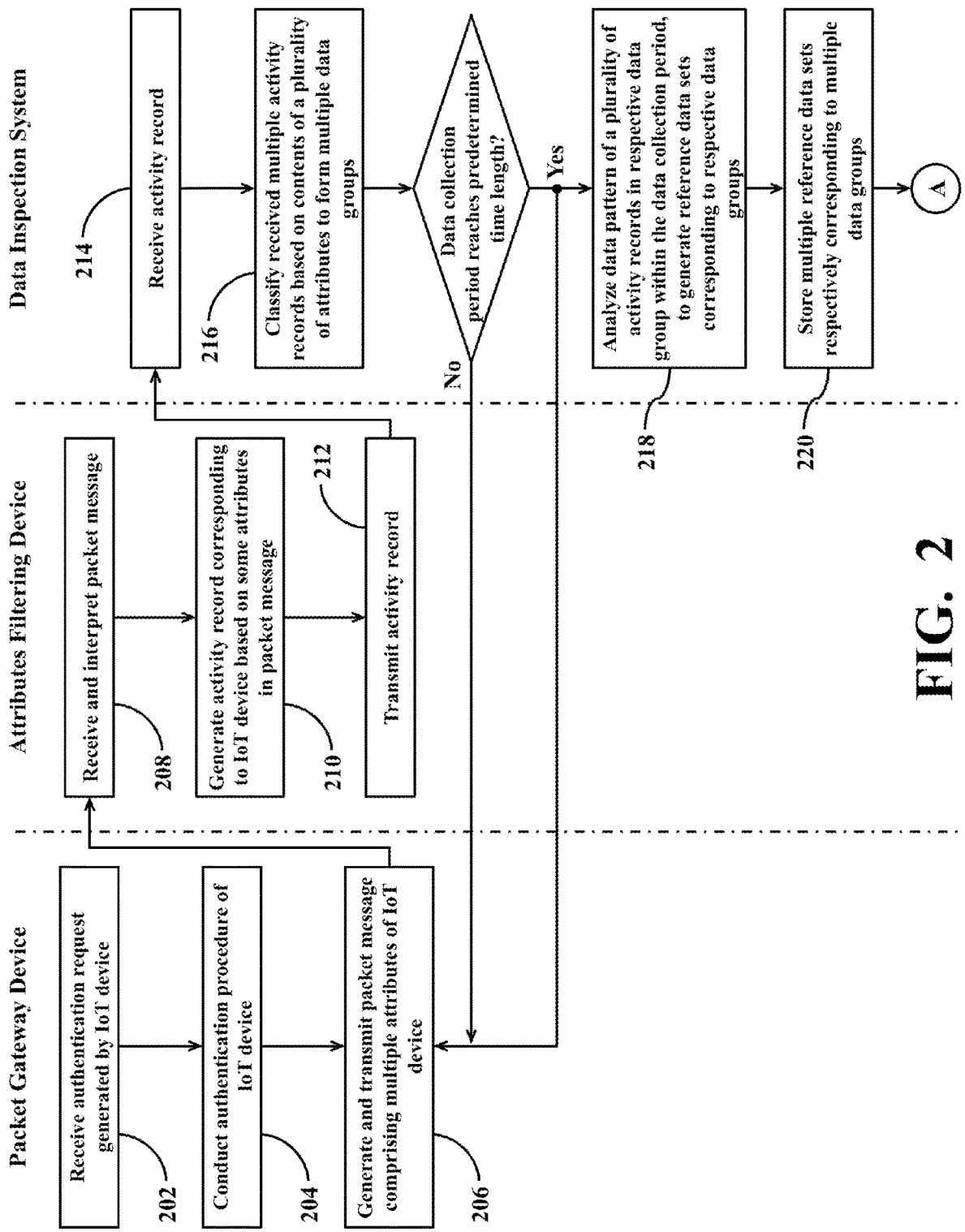
FIG. 2 shows a simplified flowchart of a method for classifying and analyzing attributes of IoT devices according to one embodiment of the present disclosure.
Figure 3:
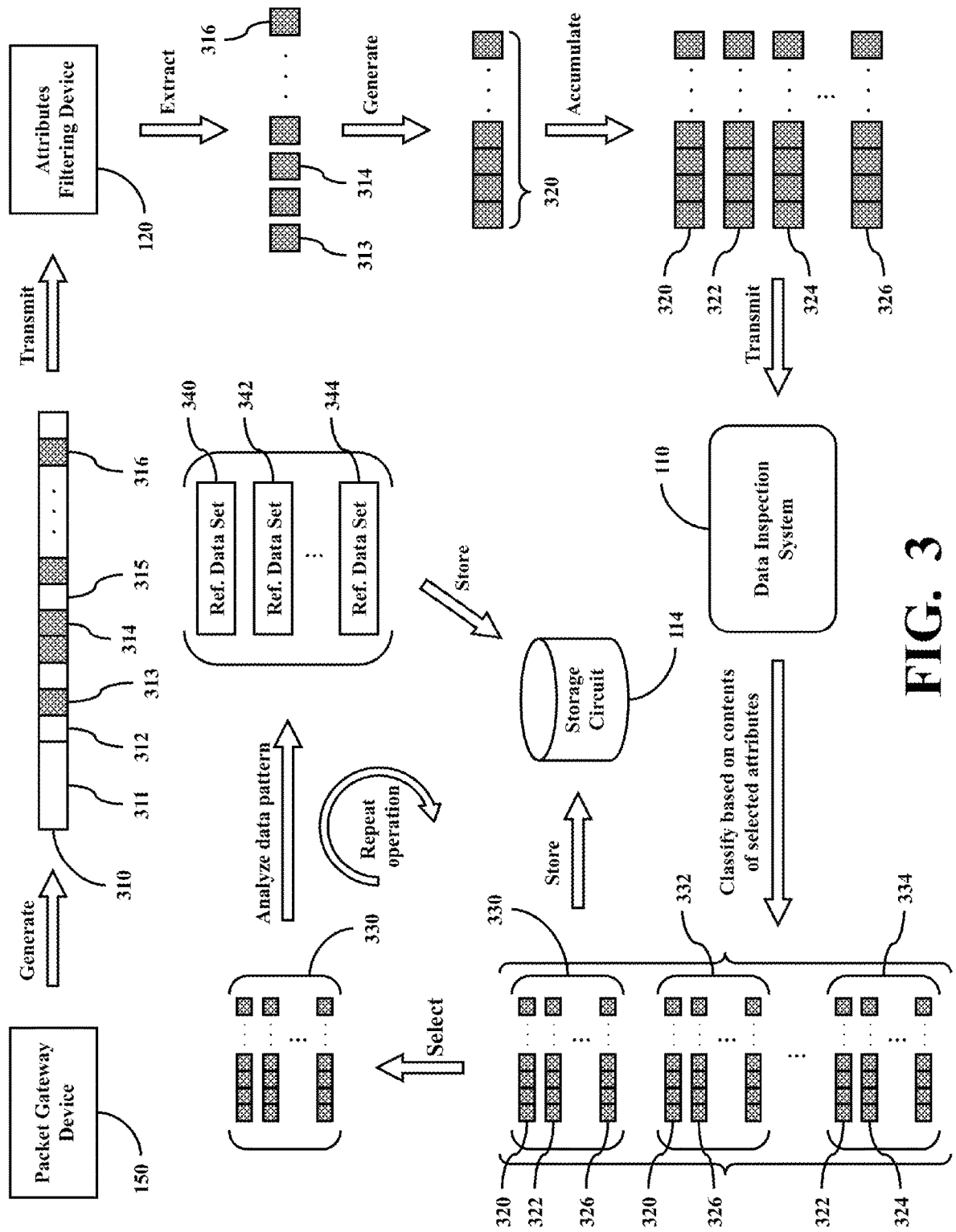
FIG. 3 shows a simplified data flow schematic diagram of conducting classifying and analyzing operations on attributes of IoT devices according to one embodiment of the present disclosure.

The operations of collecting and classifying relevant operation data of multiple IoT devices in the target IoT systems 101, 102, and 103 conducted by the IoT operations monitoring system 100 will be further described in the following by reference to FIGS. 2-3. FIG. 2 shows a simplified flowchart of a method for classifying and analyzing attributes of IoT devices according to one embodiment of the present disclosure. FIG. 3 shows a simplified data flow schematic diagram of conducting classifying and analyzing operations on the attributes of IoT devices according to one embodiment of the present disclosure.

In the flowchart of FIG. 2, operations within a column under the name of a specific device are operations to be performed by the specific device. For example, operations within a column under the label "packet gateway device" are operations to be performed by the packet gateway devices 150, 160, and 170; operations within a column under the label "attributes filtering device" are operations to be performed by the attributes filtering devices 120, 130, and 140; operations within a column under the label "data inspection system" are operations to be performed by the data inspection system 110, and so forth. The same analogous arrangement also applies to the subsequent flowcharts.

For the convenience of description, the operations of collecting and classifying the relevant operation data of multiple IoT devices in the target IoT system 101 conducted by the IoT operations monitoring system 100 will be taken as an example for description of operations of FIG. 2 in the following.

In operations, individual IoT device 104 in the target IoT system 101 generates and transmits a relevant authentication request to the neighboring base station 152 to request for the network accessing authority. In this situation, the base station 152 transmits the authentication request transmitted from the individual IoT device 104 to the relevant packet gateway device 150 for further processing.

In this situation, the packet gateway device 150 performs the operation 202 of FIG. 2 to receive the authentication request generated by the individual IoT device 104 through the base station 152.

In the operation 204, the packet gateway device 150 may conduct authentication procedure of the individual IoT device 104 according to the received authentication request. After the authentication procedure is completed, the individual IoT device 104 in the target IoT system 101 may acquire the network accessing authority, and may conduct various data communications or command transmissions with a remote back-end system through the neighboring base station 152 and relevant packet gateway device 150. The aforementioned back-end system may be the data inspection system 110, or may be other application control systems (not shown in FIG. 1).

In practice, different IoT devices in the target IoT system 101 may conduct the authentication procedure during the same time period, or may conduct the authentication procedure during different time periods.

During the operation of the target IoT system 101, the packet gateway device 150 intermittently receives relevant data transmitted from the individual IoT device 104, and intermittently performs the operation 206.

In the operation 206, the packet gateway device 150 generates and transmits a packet message comprising multiple attributes of the individual IoT device 104 to the corresponding attributes filtering device 120. The packet gateway device 150 may utilize appropriate data format to integrate multiple attributes relevant to the individual IoT device 104 into a packet message 310. In other words, each packet message 310 corresponds to one of the IoT devices 104 in the target IoT system 101. As shown in FIG. 3, the packet message 310 comprises a header 311 and multiple attributes (e.g., the exemplary attributes 312, 313, 314, 315, and 316 in FIG. 3) stored in different data fields.

The attributes recorded in the packet message 310 by the packet gateway device 150 may comprise various relevant data, such as a packet time, a session ID, a network address of the IoT device 104, a device ID of the IoT device 104, a group ID corresponding to the IoT device 104, a device status of the IoT device 104, an uplink throughput of the IoT device 104, a downlink throughput of the IoT device 104, a base station ID of the base station 152, and/or a service type of the IoT device 104. The aforementioned group ID may be an APN (access point name). In addition, in the embodiment where the IoT device 104 is equipped with a SIM (Subscriber Identity Module), the aforementioned device ID may be the SIM number.

In some embodiments, the attributes recorded in the packet message 310 by the packet gateway device 150 may further comprise a packet gateway ID of the packet gateway device 150, and/or a session time of the IoT device 104. The aforementioned packet gateway ID may be the network address of the packet gateway device 150.

In practice, the packet gateway device 150 may further record other attributes or data relevant to the individual IoT device 104 in the packet message 310 according to the application purpose of the target IoT system 101. The packet message 310 comprising the multiple attributes of the individual IoT device 104 and generated by the packet gateway device 150 may be realized with packets of various appropriate formats. In some embodiments, for example, the packet message 310 generated by the packet gateway device 150 may be realized with an Accounting-Request Packet.

For the convenience of description, it is assumed hereinafter that the multiple attributes in the packet message 310 generated by the packet gateway device 150 in the operation 206 are attributes relevant to a specific IoT device 104 (hereinafter referred to as target IoT device 104) in the target IoT system 101.

In the operation 208, the data processing circuit 122 of the attributes filtering device 120 receives and interprets the packet message 310 transmitted from the packet gateway device 150 through the network 154.

Then, the data processing circuit 122 performs the operation 210 to generate an activity record 320 corresponding to the target IoT device 104 based on some attributes in the packet message 310.

As shown in FIG. 3, after the data processing circuit 122 receives the packet message 310 transmitted from the attributes filtering device 120, the data processing circuit 122 interprets and extracts the aforementioned multiple attributes recorded in the packet message 310. Then, the data processing circuit 122 filters some attributes (e.g., the exemplary attributes 313, 314, and 316 in FIG. 3) from the extracted multiple attributes, and generates the activity record 320 corresponding to the target IoT device 104 based on the attributes.

In other words, the activity record 320 generated by the data processing circuit 122 does not comprise all attributes recorded in the packet message 310. Instead, the activity record 320 generated by the data processing circuit 122 only comprises some attributes recorded in the packet message 310.

For example, the data processing circuit 122 may utilize appropriate data format to integrate a device ID of the target IoT device 104, a group ID corresponding to the target IoT device 104, a device status of the target IoT device 104, an uplink throughput of the target IoT device 104, a downlink throughput of the target IoT device 104, and a base station ID of the base station 152 recorded in the packet message 310 into the activity record 320 corresponding to the target IoT device 104.

In some embodiments, the data processing circuit 122 may further integrate a packet gateway ID of the packet gateway device 150, and/or a session time of the target IoT device 104 recorded in the packet message 310 into the activity record 320 corresponding to the target IoT device 104.

Obviously, the quantity of the attributes recorded in the activity record 320 generated by the data processing circuit 122 is less than the quantity of the attributes recorded in the packet message 310.

In the operation 212, the data transmission circuit 124 of the attributes filtering device 120 transmits one or more activity records generated by the data processing circuit 122 to the data inspection system 110 through the network 182.

In this situation, the communication circuit 111 of the data inspection system 110 performs the operation 214 to receive the one or more activity records transmitted from the attributes filtering device 120. As described previously, the data interpreting circuit 112 may interpret the activity records received by the communication circuit 111 to extract relevant data in each activity record, that is, the aforementioned multiple attributes recorded in each activity record.

In practice, the data transmission circuit 124 may perform the operation 212 to transmit an activity record to the data inspection system 110 once the data processing circuit 122 generates the activity record.

Alternatively, the data transmission circuit 124 may perform the aforementioned operation 212 on a batch basis until the quantity of the activity records generated by the data processing circuit 122 accumulates to a predetermined quantity. For example, the data transmission circuit 124 may be arranged to operably transmit the activity records to the data inspection system 110 on a batch basis until a quantity of the activity records generated by the data processing circuit 122 accumulates to 10, 30, 50, 100, 300, 500, 700, 1000, 1500, or 2000.

Alternatively, the data transmission circuit 124 may intermittently or periodically conduct the activity record transmission in the operation 212. For example, the data transmission circuit 124 may be arranged to operably transmit periodically the currently accumulated activity records to the data inspection system 110 every second, every three seconds, every five seconds, every ten seconds, every fifteen seconds, every thirty seconds, every sixty seconds, every one-hundred seconds, every three minutes, every five minutes, every ten minutes, every fifteen minutes, every thirty minutes, every hour, every one and half hour, or other appropriate time intervals.

In the embodiment of FIG. 3, the data transmission circuit 124 transmits multiple activity records (e.g., the exemplary activity records 320, 322, 324, and 326 in FIG. 3) generated by the data processing circuit 122 to the data inspection system 110 through the network 182 on a batch basis.

The packet gateway device 150 repeats the aforementioned operation 202 through the operation 206 to generate and transmit many packet messages corresponding to other IoT devices in the target IoT system 101 to the attributes filtering device 120. The attributes filtering device 120 repeats the aforementioned operation 208 through the operation 212 to generate and transmit many activity records corresponding to other IoT devices in the target IoT system 101 to the data inspection system 110.

On the other hand, each of the other packet gateway devices in the IoT operations monitoring system 100 (e.g., the aforementioned packet gateway devices 160 and 170) and each of the other attributes filtering device in the IoT operations monitoring system 100 (e.g., the aforementioned attributes filtering devices 130 and 140) may perform operations according to the method as elaborated above.

For example, the packet gateway device 160 may repeat the operation 202 through the operation 206 to generate and transmit many packet messages corresponding to multiple IoT devices 105 in the target IoT system 102 to the attributes filtering device 130 according to the method adopted by the packet gateway device 150 as elaborated above. The attributes filtering device 130 may repeat the operation 208 through the operation 212 to generate and transmit many activity records corresponding to multiple IoT devices 105 in the target IoT system 102 to the data inspection system 110 according to the method adopted by the attributes filtering device 120 as elaborated above.

For another example, the packet gateway device 170 may repeat the operation 202 through the operation 206 to generate and transmit many packet messages corresponding to multiple IoT devices 106 in the target IoT system 103 to the attributes filtering device 140 according to the method adopted by the packet gateway device 150 as elaborated above. The attributes filtering device 140 may repeat the operation 208 through the operation 212 to generate and transmit many activity records corresponding to multiple IoT devices 106 in the target IoT system 103 to the data inspection system 110 according to the method adopted by the attributes filtering device 120 as elaborated above.

Therefore, the communication circuit 111 of the data inspection system 110 would successively receive many activity records generated by the attributes filtering devices 120, 130, and 140.

On the other hand, the data classification circuit 114 performs the operation 216 to classify each of the multiple activity records successively received by the communication circuit 111 based on contents of a plurality of attributes to form multiple data groups.

Figure 4:
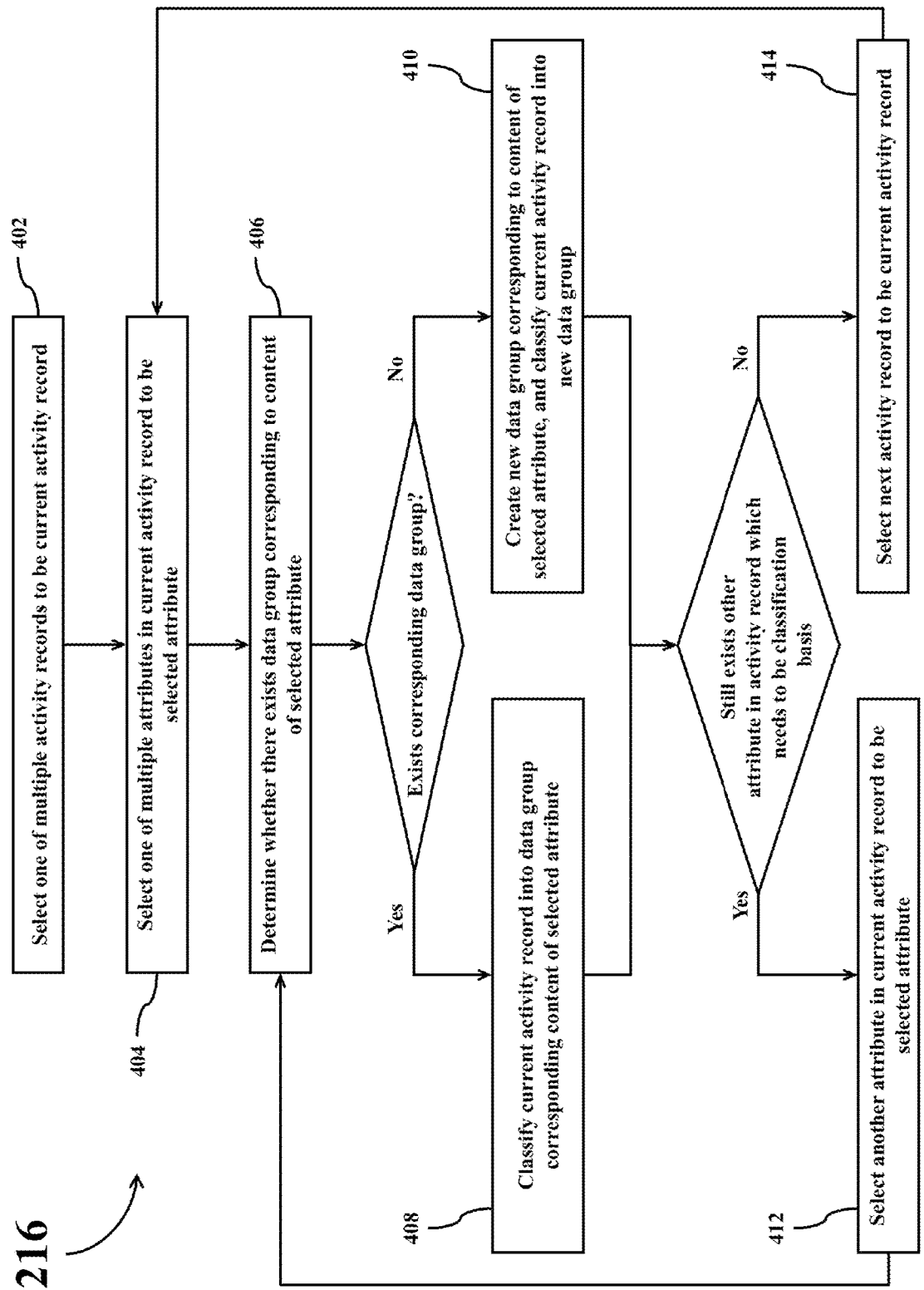
FIG. 4 shows a simplified flowchart of a method for classifying multiple activity records based on contents of attributes according to one embodiment of the present disclosure.
Figure 5:
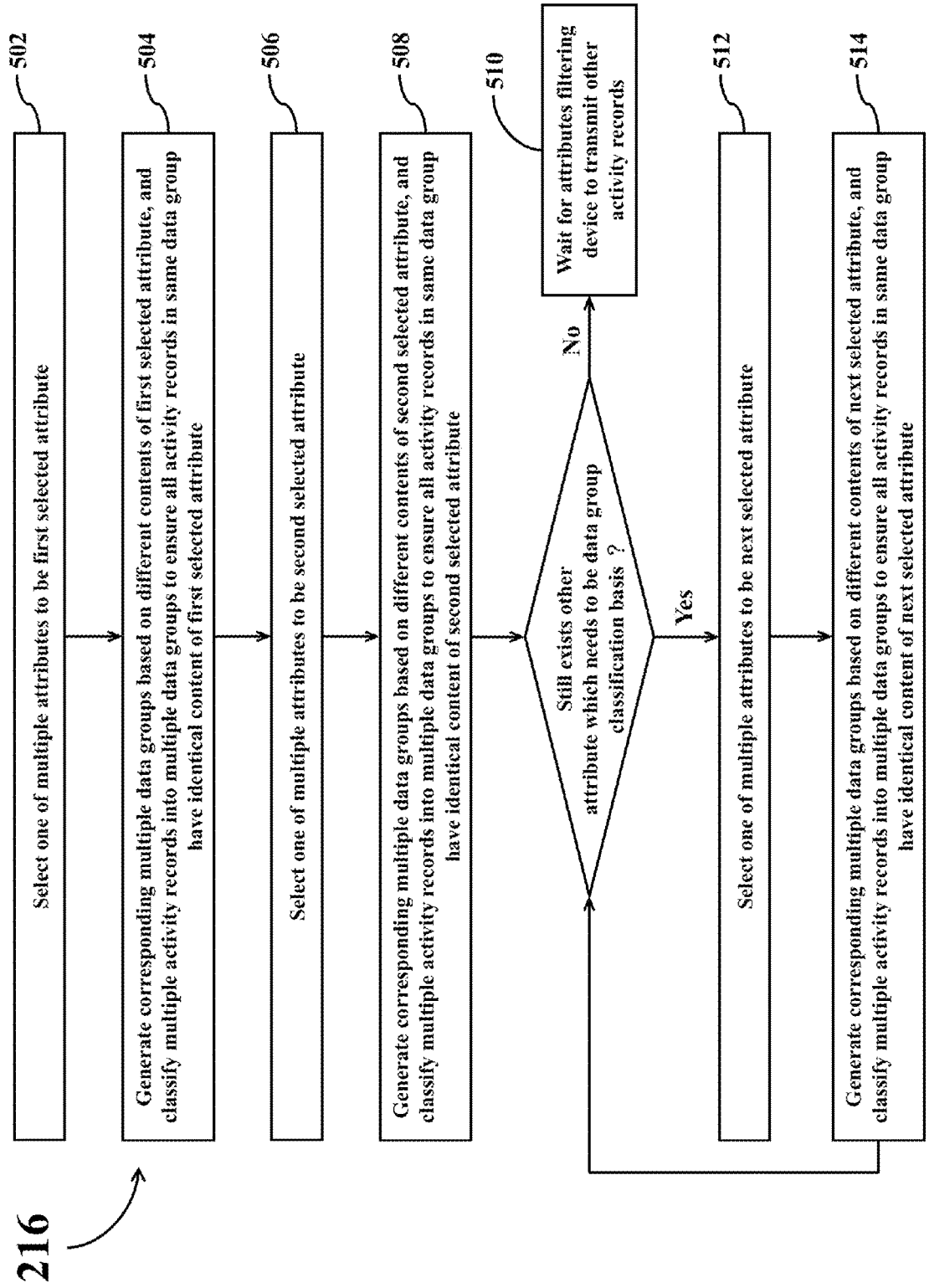
FIG. 5 shows a simplified flowchart of a method for classifying multiple activity records based on contents of attributes according to another embodiment of the present disclosure.

The operations of classifying multiple activity records based on contents of attributes conducted by the data classification circuit 114 in the operation 216 will be further described in the following by reference to FIG. 4 and FIG. 5. FIG. 4 shows a simplified flowchart of a method for classifying multiple activity records based on contents of attributes according to one embodiment of the present disclosure. FIG. 5 shows a simplified flowchart of a method for classifying multiple activity records based on contents of attributes according to another embodiment of the present disclosure.

The data classification circuit 114 may classify multiple activity records successively received by the communication circuit 111 based on contents of a plurality of attributes to form multiple data groups in the aforementioned operation 216 by adopting the method of FIG. 4.

For the convenience of description by reference to the data flow schematic diagram of FIG. 3, it is assumed hereinafter that the multiple activity records which need to be classified by the data classification circuit 114 include the aforementioned activity records 320, 322, 324, and 326.

In practice, the data classification circuit 114 may utilize some attributes recorded in each activity record to be a classification basis of the respective activity record.

In some embodiments, for example, the data classification circuit 114 may utilize the base station ID and the group ID recorded in each activity record to be the classification basis.

In other embodiments, the data classification circuit 114 may utilize the base station ID, the group ID, and the packet gateway ID recorded in each activity record to be the classification basis.

In the operation 402, the data classification circuit 114 may select one of the multiple activity records received by the communication circuit 111 to be a current activity record.

In the operation 404, the data classification circuit 114 may select one of the multiple attributes in the current activity record to be a selected attribute. In operations, the data classification circuit 114 may select one attribute that may be utilized as a classification basis from the current activity record to be a selected attribute.

In the operation 406, the data classification circuit 114 may determine whether there exists any data group corresponding to a content of the selected attribute in the storage circuit 113 or not. If there currently exists a data group corresponding to the content of the selected attribute in the storage circuit 113, then the data classification circuit 114 may perform the operation 408. On the contrary, if there currently exists no data group corresponding to the content of the selected attribute in the storage circuit 113, then the data classification circuit 114 may perform the operation 410.

In the operation 408, the data classification circuit 114 may classify the current activity record into the data group corresponding to the content of the selected attribute.

In the operation 410, the data classification circuit 114 may create a new data group corresponding to the content of the selected attribute, and may classify the current activity record into the newly-created data group.

After performing the aforementioned operation 408 or operation 410, if there still exists other attribute in the current activity record which needs to be utilized as a classification basis, then the data classification circuit 114 may perform the operation 412. On the contrary, if there exists no attribute in the current activity record which needs to be utilized as a classification basis, then the data classification circuit 114 may perform the operation 414.

In the operation 412, the data classification circuit 114 may select another attribute in the current activity record to be the selected attribute, and then may repeat the aforementioned operation 406 and subsequent operations.

In the operation 414, the data classification circuit 114 may select a next activity record to be a new current activity record, and then may repeat the aforementioned operation 404 and subsequent operations.

For example, the data classification circuit 114 may select the activity record 320 to be the current activity record in the operation 402, and may select the base station ID recorded in the activity record 320 to be the selected attribute in the operation 404.

It is assumed that a content of the base station ID recorded in the activity record 320 corresponds to a base station ID BS-152 of the base station 152, then the data classification circuit 114 inspects whether there currently exists any data group corresponding to the content of the selected attribute (e.g., the base station ID BS-152 in this case) in the storage circuit 113 or not in the operation 406.

If there currently exists a data group 330 corresponding to the base station ID BS-152 in the storage circuit 113, then the data classification circuit 114 may perform the operation 408 to classify the current activity record (e.g., the activity record 320 in this case) into the data group 330. On the contrary, if there currently exists no data group corresponding to the base station ID BS-152 in the storage circuit 113, then the data classification circuit 114 may perform the operation 410 to create a new data group 330 corresponding to the base station ID BS-152, and to the classify the current activity record (e.g., the activity record 320 in this case) into the data group 330.

In the present example case, since there still exists other attribute in the activity record 320 which needs to be utilized as a classification basis, after the data classification circuit 114 classifies the activity record 320 into the data group 330, the data classification circuit 114 may further perform the operation 412 to select another attribute that can be utilized as a classification basis to be the selected attribute from the activity record 320, and may repeat the aforementioned operation 406 and subsequent operations.

For the convenience of description, it is assumed hereinafter that the data classification circuit 114 selects a group ID recorded in the activity record 320 to be the selected attribute in the operation 412, and a content of the group ID corresponds to an identification data APN-A of a first specific client (e.g., an electricity company, a logistics vendor, a street light management agency, or the like). In this situation, the data classification circuit 114 inspects whether there currently exists any data group corresponding to the identification data APN-A in the storage circuit 113 or not in the operation 406.

If there currently exists a data group 332 corresponding to the identification data APN-A in the storage circuit 113, then the data classification circuit 114 may perform the operation 408 to classify the activity record 320 into the data group 332. On the contrary, if there currently exists no data group corresponding to the identification data APN-A in the storage circuit 113, then the data classification circuit 114 may perform the operation 410 to create a new data group 332 corresponding to the identification data APN-A, and to the classify the activity record 320 into the data group 332.

If the activity record 320 is also recorded with a packet gateway ID which can be utilized as a classification basis, then after the data classification circuit 114 classifies the activity record 320 into the data group 332, the data classification circuit 114 may perform the operation 412 again to select the packet gateway ID recorded in the activity record 320 to be the selected attribute, and may repeat the aforementioned operation 406 and subsequent operations according to the method as elaborated above. As a result, the activity record 320 would end up being classified into three different data groups.

As can be appreciated from the foregoing descriptions, if the data classification circuit 114 classifies the activity record 320 based on N attributes recorded in the activity record 320, then the activity record 320 would end up being classified into N different data groups.

As described previously, if there currently exists no attribute in the activity record 320 which needs to be utilized as the classification basis, then the data classification circuit 114 may perform the operation 414 to select a next activity record to be a new current activity record, and may repeat the aforementioned operation 404 and subsequent operations.

For example, the data classification circuit 114 may select an activity record 322 to be the new current activity record in the operation 402, and may select the base station ID recorded in the activity record 322 to be the selected attribute in the operation 404.

It is assumed hereinafter that a content of the base station ID recorded in the activity record 322 is the identification data BS-152 of the base station 152. The data classification circuit 114 inspects whether there currently exists any data group corresponding to the content of the selected attribute (e.g., the identification data BS-152 of the base station 152 in this case) in the storage circuit 113 or not in the operation 406.

Since there currently exists the data group 330 corresponding to the identification data BS-152 in the storage circuit 113, the data classification circuit 114 may perform the operation 408 to classify the activity record 322 into the data group 330.

Since there still exists other attribute in the activity record 322 which needs to be utilized as a classification basis, after the data classification circuit 114 classifies the activity record 322 into the data group 330, the data classification circuit 114 may further perform the operation 412 to select another attribute that can be utilized as the classification basis from the activity record 322 to be the selected attribute, and may repeat the aforementioned operation 406 and subsequent operations.

For the convenience of description, it is assumed hereinafter that the data classification circuit 114 selects the group ID recorded in the activity record 322 to be the selected attribute in the operation 412, and the content of the group ID corresponds to the identification data APN-B of a second specific client. In this situation, the data classification circuit 114 inspects whether there currently exists any data group corresponding to the identification data APN-B in the storage circuit 113 or not in the operation 406.

If there currently exists a data group 334 corresponding to the identification data APN-B in the storage circuit 113, then the data classification circuit 114 may perform the operation 408 to classify the activity record 322 into the data group 334. On the contrary, if there currently exists no data group corresponding to the identification data APN-B in the storage circuit 113, then the data classification circuit 114 may perform the operation 410 to create a new data group 334 corresponding to the identification data APN-B, and to the classify the activity record 322 into the data group 334.

Similarly, if the activity record 322 is also recorded with a packet gateway ID which can be utilized as a classification basis, then after the data classification circuit 114 classifies the activity record 322 into the data group 334, the data classification circuit 114 may perform the operation 412 again to select the packet gateway ID recorded in the activity record 322 to be the selected attribute, and may repeat the aforementioned operation 406 and subsequent operations according to the method as elaborated above. As a result, the activity record 322 would end up being classified into three different data groups.

The data classification circuit 114 may adopt the method of FIG. 4 as elaborated above to classify other activity records received by the communication circuit 111.

As shown in FIG. 3, for example, if a content of the base station ID recorded in an activity record 324 is the base station ID BS-152, and a content of the group ID recorded in the activity record 324 is the identification data APN-B, then the data classification circuit 114 may classify the activity record 324 into the data group 330 and the data group 334 according to the aforementioned classification method.

For another example, if the content of the base station ID recorded in the activity record 326 is the base station ID BS-152, and the content of the group ID recorded in the activity record 326 is the identification data APN-A, then the data classification circuit 114 may classify the activity record 326 into the data group 330 and the data group 332 according to the aforementioned classification method.

Apart from the aforementioned method of FIG. 4, the data classification circuit 114 may adopt other approaches to perform the aforementioned operation 216. For example, FIG. 5 shows a simplified flowchart of a method for classifying multiple activity records based on contents of attributes according to another embodiment of the present disclosure. Another approach for classifying multiple activity records based on contents of attributes that may be conducted by the data classification circuit 114 in the operation 216 will be further described in the following by reference to FIG. 5.

In the embodiment of FIG. 5, the data classification circuit 114 may utilize some attributes recorded in an activity record (e.g., the aforementioned base station ID, group ID, and/or packet gateway ID, or the like) to be the classification basis of the activity record.

In the operation 502, the data classification circuit 114 may select one of the aforementioned multiple attributes which need to be utilized as the classification basis of the activity record to be a first selected attribute. For example, the data classification circuit 114 may select the aforementioned group ID to be the first selected attribute.

In the operation 504, the data classification circuit 114 may generate corresponding multiple data groups based on different contents of the first selected attribute, and may classify the multiple activity records received by the communication circuit 111 into the multiple data groups to ensure that all activity records in the same data group have identical content of the first selected attribute.

In operations, the data classification circuit 114 may check how many different contents of the first selected attribute recorded in the multiple activity records are, and then create a corresponding quantity of multiple data groups. For example, if the first selected attribute is a group ID, and the group ID recorded in the multiple activity records have ten different contents, then the data classification circuit 114 may create 10 data groups respectively corresponding to the ten different contents of the group ID (hereinafter referred to as first attribute data groups). Then, the data classification circuit 114 may classify the activity records having different contents of group ID into different first attribute data groups so that all activity records in the same first attribute data group have identical content of the group ID. In normal situations, each of the first attribute data groups comprises a plurality of activity records, but different first attribute data groups may contain different quantity of activity records.

In the operation 506, the data classification circuit 114 may select another attribute which needs to be utilized as the classification basis to be a second selected attribute. For example, the data classification circuit 114 may select the aforementioned base station ID to be the second selected attribute.

In the operation 508, the data classification circuit 114 may generate corresponding multiple data groups based on different contents of the second selected attribute, and may classify the multiple activity records received by the communication circuit 111 into the multiple data groups to ensure that all activity records in the same data group have identical content of the second selected attribute.

For example, if the second selected attribute is a base station ID, and the base station ID recorded in the multiple activity records have five different contents, then the data classification circuit 114 may create 5 data groups respectively corresponding to the five different contents of the base station ID (hereinafter referred to as second attribute data groups). Then, the data classification circuit 114 may classify the activity records having different contents of base station ID into different second attribute data groups so that all activity records in the same second attribute data group have identical content of the base station ID. In normal situations, each of the second attribute data groups comprises a plurality of activity records, but different second attribute data groups may contain different quantity of activity records.

After performing the aforementioned operation 508, the data classification circuit 114 determines whether there still exists other attribute which needs to be utilized as a data group classification basis or not. If there exists no attribute which needs to be utilized as a classification basis for data groups, then the data classification circuit 114 may perform the operation 510. On the contrary, if there still exists other attribute which needs to be utilized as a classification basis for data groups, then the data classification circuit 114 may perform the operation 512.

In the operation 510, the data classification circuit 114 may wait for other attributes filtering devices 120, 130, and 140 to transmit other activity records.

In the operation 512, the data classification circuit 114 may select another attribute needs to be utilized as a classification basis as a next selected attribute.

In the operation 514, the data classification circuit 114 may generate corresponding multiple data groups based on different contents of the next selected attribute, and may classify the multiple activity records received by the communication circuit 111 into the multiple data groups to ensure that all activity records in the same data group have identical content of the next selected attribute.

For example, if the multiple activity records received by the communication circuit 111 are also recorded with a packet gateway ID which can be utilized as a classification basis, then the data classification circuit 114 may perform the operation 512 to select the packet gateway ID to be a next selected attribute. If the packet gateway ID recorded in the multiple activity records have three different contents, then the data classification circuit 114 may create 3 data groups respectively corresponding to the three different contents of the packet gateway ID (hereinafter referred to as third attribute data groups) in the operation 514. Then, the data classification circuit 114 may classify the activity records having different contents of the packet gateway ID into different third attribute data groups so that all activity records in the same third attribute data group have identical content of the packet gateway ID. Similarly, in normal situations, each of the third attribute data groups comprises a plurality of activity records, but different third attribute data groups may contain different quantity of activity records.

After performing the operation 514, the data classification circuit 114 determines again whether there still exists other attribute which needs to be utilized as a data group classification basis or not. If there exists no attribute to be utilized as a data group classification basis, then the data classification circuit 114 may perform the operation 510. On the contrary, if there still exists other attribute which needs to be utilized as a data group classification basis, then the data classification circuit 114 may repeat the aforementioned operation 512 and operation 514 to continue classifying the multiple activity records received by the communication circuit 111 based on contents of other attributes until all attributes which need to be utilized as the classification basis are used up.

The data classification circuit 114 may adopt the method of FIG. 5 as elaborated above to classify other activity records subsequently received by the communication circuit 111.

As can be appreciated from the foregoing descriptions of FIG. 4 and FIG. 5, since the contents of the same attribute recorded in different activity records may be different, after the data classification circuit 114 classifies each activity record generated by the attributes filtering devices 120, 130, and 140 based on N attributes, M data groups would be formed, wherein N is 2 or an integer greater than 2, while M is at least two times of N. If there are more than two possibilities for the content of respective attributes in different activity records, M will be a higher multiple of N.

As described previously, the data inspection system 110 may receive relevant data of the target IoT system 101, 102, or 103 from external client devices 192 and/or 194. When performing the operation 216 of FIG. 2, the data classification circuit 114 may further utilize the data provided by the client devices 192 and/or 194 to be an additional classification basis for the aforementioned multiple activity records.

For example, in some embodiments where the data inspection system 110 receives from the client devices 192 and/or 194 the site ID corresponding to the respective IoT devices in the target IoT system 101, 102, or 103, the data classification circuit 114 may utilize the site ID to be an additional attribute which can be utilized as a classification basis for the aforementioned multiple activity records.

If the data classification circuit 114 classifies multiple activity records by adopting the aforementioned method of FIG. 4, then the data classification circuit 114 may determine whether there exists any data group corresponding to a content of the site ID in the current activity record in the storage circuit 113 or not when the data classification circuit 114 classifies the current activity record. If there currently exists a data group corresponding to the content of the site ID in the storage circuit 113, then the data classification circuit 114 may perform the operation 408 to classify the current activity record into the data group corresponding to the content of the site ID. On the contrary, if there currently exists no data group corresponding to the content of the site ID in the storage circuit 113, then the data classification circuit 114 may perform the operation 410 to create a new data group corresponding to the content of the site ID, and may classify the current activity record into the newly-created data group.

If the data classification circuit 114 classifies multiple activity records by adopting the aforementioned method of FIG. 5, then the data classification circuit 114 may check how many different contents of the site ID recorded in the multiple activity records are, and then create a corresponding quantity of multiple data groups. For example, if the site ID recorded in the multiple activity records have 120 different contents, then the data classification circuit 114 may create 120 data groups respectively corresponding to the 120 different contents of the site ID (hereinafter referred to as fourth attribute data groups). Then, the data classification circuit 114 may classify the activity records having different contents of site ID into different fourth attribute data groups so that all activity records in the same fourth attribute data group have identical content of the site ID. Similar to the foregoing descriptions, each of the fourth attribute data groups comprises a plurality of activity records, but different fourth attribute data groups may contain different quantity of activity records.

In practice, the aforementioned operations of classifying respective activity record conducted by the data classification circuit 114 may be realized with a method of duplicating each activity record into multiple corresponding data groups, or may be realized with a method of assigning tags corresponding to multiple data groups to each activity record, or may be realized with a method of attaching note data to each activity record.

As time passes, the attributes filtering devices 120, 130, and 140 would successively generate many activity records related to different IoT devices in the target IoT systems 101, 102, and 103, and the data inspection system 110 would classify many activity records generated by the attributes filtering devices 120, 130, and 140 according to the method as elaborated above. A period during which the data inspection system 110 receives activity records generated by the attributes filtering devices 120, 130, and 140 may be referred to as a data collection period.

During operations, the data pattern analysis circuit 115 of the data inspection system 110 determines whether the aforementioned data collection period has reached a predetermined time length or not. In practice, the data pattern analysis circuit 115 may configure the aforementioned predetermined time length as an appropriate length of time, such as one day, three days, five days, seven days, ten days, fourteen days, twenty-one days, twenty-eight days, thirty days, or the like.

As shown in FIG. 2, before the data collection period reaches a predetermined time length, the attributes filtering devices 120, 130, and 140 continue to generate more activity records according to the packet messages transmitted from the packet gateway devices 150, 160, and 170; the communication circuit 111 successively receives more activity records generated by the attributes filtering devices 120, 130, and 140; and the data classification circuit 114 successively classifies many activity records received by the communication circuit 111.

After the data collection period reaches the aforementioned predetermined time length, the attributes filtering devices 120, 130, and 140, the communication circuit 111, and the data classification circuit 114 keep repeating the aforementioned operations, while the data pattern analysis circuit 115 performs the operation 218 and the operation 220 of FIG. 2.

In the operation 218, the data pattern analysis circuit 115 of the data inspection system 110 analyzes a data pattern of a plurality of activity records in respective data group generated by the data classification circuit 114 within the data collection period, so as to generate one or more reference data sets corresponding to the respective data groups.

As can be appreciated from the foregoing descriptions of the operation 216, the data classification circuit 114 classifies the multiple activity records generated by the attributes filtering devices 120, 130, and 140 based on contents of a certain quantity of attributes to form multiple data groups, and each of the data groups comprises a plurality of activity records. Different data groups respectively correspond to different contents of an attribute, but all activity records in the same data group have identical content of an attribute.

In the operation 220, the data pattern analysis circuit 115 stores the one or more generated reference data sets in the storage circuit 113. In practice, the data pattern analysis circuit 115 may perform the operation 218 and the operation 220 at the same time.

Figure 6:
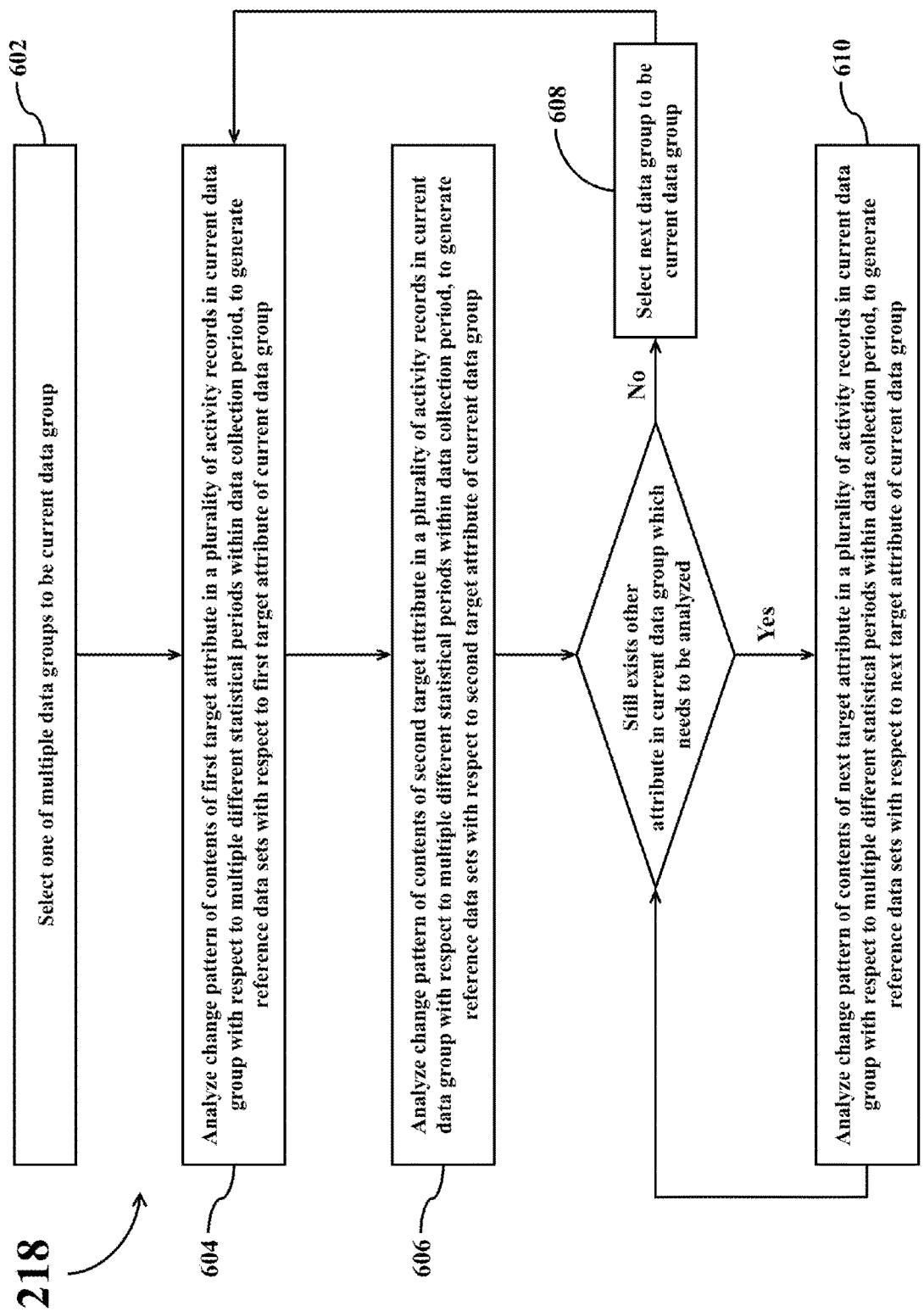
FIG. 6 shows a simplified flowchart of a method for generating reference data sets corresponding to respective data group according to one embodiment of the present disclosure.

The operations of analyzing the data pattern of respective data groups to generate corresponding reference data sets conducted by the data pattern analysis circuit 115 in the operation 218 will be further described in the following by reference to FIG. 6. FIG. 6 shows a simplified flowchart of a method for generating reference data sets corresponding to respective data group according to one embodiment of the present disclosure.

When performing the aforementioned operation 218, the data pattern analysis circuit 115 may analyze the data pattern of activity records in respective data groups so as to generate one or more reference data sets corresponding to the respective data groups by adopting the method of FIG. 6.

For the convenience of description by reference to the data flow schematic diagram of FIG. 3, it is assumed hereinafter that the multiple data groups which need to be analyzed by the data pattern analysis circuit 115 include the aforementioned data groups 330, 332, and 334 in FIG. 3.

In practice, the data pattern analysis circuit 115 may utilize some attributes recorded in multiple activity records in the same data group to be an analysis basis of the data group.

For example, the data pattern analysis circuit 115 may utilize the device status, the uplink throughput, and/or the downlink throughput recorded in the activity records to be the analysis basis.

In the embodiments where the aforementioned activity records are also recorded with a session time of related IoT devices, in addition to the aforementioned three attributes, the data pattern analysis circuit 115 may further utilize the session time recorded in the activity records to be an analysis basis.

If the aforementioned activity records are not recorded with a session time of related IoT devices, the data pattern analysis circuit 115 may estimate the session time of related IoT device according to contents of device status recorded in different activity records. It is because that in the same data group, different activity records with the same content of device ID correspond to the same IoT device. Thus, if there exist two activity records with the same content of device ID (which means that they correspond to the same IoT device), the content of the device status recorded in one activity record is "Stop", the content of the device status recorded in a prior activity record is "Start", then the data pattern analysis circuit 115 may calculate the difference between the receiving time of the two activity records, and may utilize the calculating result to estimate the session time of the IoT device corresponding to the two activity records.

In the operation 602, the data pattern analysis circuit 115 may select one of the multiple data groups generated by the data classification circuit 114 to be a current data group. As can be appreciated from the foregoing descriptions, the current data group comprises a plurality of activity records.

In the operation 604, the data pattern analysis circuit 115 may analyze a change pattern of the contents of a target attribute (hereinafter referred to as first target attribute) in a plurality of activity records in the current data group with respect to multiple different statistical periods within the data collection period, so as to generate one or more reference data sets with respect to the first target attribute of the current data group.

In the operation 606, the data pattern analysis circuit 115 may analyze a change pattern of the contents of another target attribute (hereinafter referred to as second target attribute) in a plurality of activity records in the current data group with respect to multiple different statistical periods within the data collection period, so as to generate one or more reference data sets with respect to the second target attribute of the current data group.

In practice, the aforementioned first target attribute and second target attribute are selected from the aforementioned attributes which can be utilized as the analysis basis (e.g., the device status, the uplink throughput, the downlink throughput, and/or the session time).

After performing the aforementioned operation 606, if there still exists other attribute in the current data group which needs to be utilized as an analysis basis, then the data pattern analysis circuit 115 may perform the operation 610. On the contrary, if there exists no attribute in the current data group which needs to be utilized as an analysis basis, then the data pattern analysis circuit 115 may perform the operation 608.

In the operation 608, the data pattern analysis circuit 115 may select another data group generated by the data classification circuit 114 to be a new current data group, and may repeat the aforementioned operation 604, operation 606, and subsequent operations on the new current data group.

In the operation 610, the data pattern analysis circuit 115 may analyze a change pattern of the contents of a next target attribute in the current data group with respect to multiple different statistical periods within the data collection period, so as to generate one or more reference data sets with respect to the next target attribute of the current data group.

After performing the aforementioned operation 610, if there still exists other attribute in the current data group which needs to be utilized as an analysis basis, then the data pattern analysis circuit 115 may repeat the operation 610. On the contrary, if there exists no attribute in the current data group which needs to be utilized as an analysis basis, then the data pattern analysis circuit 115 may perform the operation 608.

For example, the data pattern analysis circuit 115 may select the data group 330 in FIG. 3 to be a current data group in the operation 602, and may select the device status recorded in the activity records in the data group 330 to be a first target attribute in the operation 604, and may select the uplink throughput recorded in the activity records in the data group 330 to be a second target attribute in the operation 606. As can be appreciated from the foregoing descriptions of the flowchart of FIG. 4, the data group 330 is a data group corresponding to the base station ID BS-152, and the data group 330 comprises a plurality of activity records including the aforementioned activity records 320, 322, and 326.

As can be appreciated from the foregoing descriptions, the content of the device status recorded in respective activity record represents an operation status of a corresponding IoT device. For example, a content of the device status recorded in the activity record 320 in the data group 330 represents an operation status of a corresponding IoT device 104. In addition, the content of the uplink throughput recorded in respective activity record represents the uplink throughput of the corresponding IoT device. For example, a content of the uplink throughput recorded in the activity record 320 in the data group 330 represents a value of the uplink throughput of a corresponding IoT device 104 within a specific period of time.

In practical applications, different IoT devices may have different operation statuses, thus different activity records in the same data group may have different contents of device status. For example, in the data group 330, the contents of device status recorded in some activity records may be "Start", the contents of device status recorded in some activity records may be may be "Stop", and the contents of device status recorded in some activity records may be "Alive".

In the operation 604, the data pattern analysis circuit 115 may divide all activity records in the data group 330 into multiple sub-groups respectively corresponding to multiple different statistical periods within the data collection period based on the receiving time of individual activity records, wherein a sum of the time length of the aforementioned multiple different statistical periods may be equal to or less than a time length of the data collection period. For example, in the embodiment where the data pattern analysis circuit 115 configures the time length of the data collection period to be one day, three days, five days, seven days, ten days, fourteen days, twenty-one days, twenty-eight days, or thirty days, the data pattern analysis circuit 115 may divide all activity records in the data group 330 into 24 sub-groups respectively corresponding to 24 hours per day, or into 12 sub-groups respectively corresponding to 12 statistical periods per day (where each statistical period is 2 hours), or into 8 sub-groups respectively corresponding to 8 statistical periods in a day (where each statistical period is 3 hours). For another example, in the embodiment where the data pattern analysis circuit 115 configures the time length of the data collection period to be seven days, fourteen days, twenty-one days, or twenty-eight days, the data pattern analysis circuit 115 may divide all activity records in the data group 330 into 7 sub-groups respectively corresponding to 7 days per week.

Then, the data pattern analysis circuit 115 may respectively calculate a sum or a moving sum of a quantity of activity records, whose device status has a specific content, in respective sub-groups, and may consolidate calculation results of different sub-groups into a set of statistical data, so as to be a reference data set of the data group 330 with respect to a specific operation status, wherein the reference data set is utilized to present a change of the sum or the moving sum of the quantity of the activity records, whose device status has the specific content, with respect to multiple different statistical periods within the data collection period.

For example, the data pattern analysis circuit 115 may respectively calculate a sum or a moving sum of a quantity of activity records, whose device status is "Start", in respective sub-groups, and may consolidate calculation results of different sub-groups into a first set statistical data, so as to present a change of the sum or the moving sum of the quantity of the activity records, whose device status is "Start", with respect to multiple different statistical periods within the data collection period.

For another example, the data pattern analysis circuit 115 may respectively calculate a sum or a moving sum of a quantity of activity records, whose device status is "Stop", in respective sub-groups, and may consolidate calculation results of different sub-groups into a second set statistical data, so as to present a change of the sum or the moving sum of the quantity of the activity records, whose device status is "Stop", with respect to multiple different statistical periods within the data collection period.

For another example, the data pattern analysis circuit 115 may respectively calculate a sum or a moving sum of a quantity of activity records, whose device status is "Alive", in respective sub-groups, and may consolidate calculation results of different sub-groups into a third set statistical data, so as to present a change of the sum or the moving sum of the quantity of the activity records, whose device status is "Alive", with respect to multiple different statistical periods within the data collection period.

In practice, the data pattern analysis circuit 115 may generate one of the aforementioned first set statistical data, second set statistical data, and third set statistical data in the operation 604, so as to be a reference data set of the data group 330 with respect to a specific content of the device status. Alternatively, the data pattern analysis circuit 115 may generate two of the aforementioned first set statistical data, second set statistical data, and third set statistical data in the operation 604, so as to respectively be two reference data sets of the data group 330 with respect to two different contents of device status. Alternatively, the data pattern analysis circuit 115 may generate the aforementioned first set statistical data, second set statistical data, and third set statistical data in the operation 604, so as to respectively be three reference data sets of the data group 330 with respect to three different contents of device status.

On the other hand, in the operation 606, the data pattern analysis circuit 115 may divide all activity records in the data group 330 into multiple sub-groups respectively corresponding to multiple different statistical periods within the data collection period based on the receiving time of individual activity records. Please note that the method for dividing the statistical periods adopted by the data pattern analysis circuit 115 in the operation 606 and the method for dividing the statistical periods adopted by the data pattern analysis circuit 115 in the aforementioned operation 604 may be the same, or may be different. In other words, a quantity of sub-groups generated by the data pattern analysis circuit 115 in the operation 606 and a quantity of sub-groups generated by the data pattern analysis circuit 115 in the aforementioned operation 604 may be the same, or may be different.

In the present embodiment, the data pattern analysis circuit 115 may respectively calculate a sum, an average, a moving sum, or a moving average of the uplink throughput recorded in all activity records in respective sub-groups, and may consolidate calculation results of different sub-groups into a fourth set statistical data, so as to be utilized as a reference data set of the data group 330 with respect to the uplink throughput, wherein the reference data set is utilized to present a change of the sum, the average, the moving sum, or the moving average of the uplink throughput recorded in all activity records with respect to multiple different statistical periods within the data collection period.

Please note that the aforementioned specific contents of the first target attribute and second target attribute analyzed by the data pattern analysis circuit 115 in the operation 604 and the operation 606 are merely an exemplary embodiment, rather than a restriction to the practical implementations. In practice, the data pattern analysis circuit 115 may swap the attributes respectively analyzed in the aforementioned operation 604 and operation 606, or may select other attributes recorded in the activity records in the data group 330 to replace the aforementioned first target attribute and second target attribute.

In other words, when performing data pattern analysis on the current data group, there is no specific restriction on the order of the analysis basis utilized by the data pattern analysis circuit 115.

As described previously, after performing the operation 606, if there still exists other attribute in the current data group (e.g., the data group 330 in this case) which needs to be utilized as an analysis basis, then the data pattern analysis circuit 115 may perform the operation 610. On the contrary, if there exists no attribute in the current data group which needs to be utilized as an analysis basis, then the data pattern analysis circuit 115 may perform the operation 608 to select another data group to be a new current data group, and may repeat the aforementioned operation 604, operation 606, and subsequent operations on the new current data group.

For example, it is assumed that the data pattern analysis circuit 115 also needs to analyze the downlink throughput in the data group 330, then the data pattern analysis circuit 115 may perform the operation 610 to respectively calculate a sum, an average, a moving sum, or a moving average of the downlink throughput recorded in all activity records in respective sub-groups, and may consolidate calculation results of different sub-groups into a fifth set statistical data, so as to be a reference data set of the data group 330 with respect to the downlink throughput, wherein the reference data set is utilized to present a change of the sum, the average, the moving sum, or the moving average of the downlink throughput recorded in all activity records with respect to multiple different statistical periods within the data collection period.

For another example, it is assumed that the data pattern analysis circuit 115 also needs to analyze the session time in the data group 330, then the data pattern analysis circuit 115 may perform the operation 610 to respectively calculate a sum, an average, a moving sum, or a moving average of the session time recorded in all activity records in respective sub-groups, and consolidate calculation results of different sub-groups into a sixth set statistical data, so as to be a reference data set of the data group 330 with respect to the session time, wherein the reference data set is utilized to present a change of the sum, the average, the moving sum, or the moving average of the session time recorded in all activity records with respect to multiple different statistical periods within the data collection period.

Please note that the method for dividing the statistical periods adopted by the data pattern analysis circuit 115 in the operation 610 and the method for dividing the statistical periods adopted by the data pattern analysis circuit 115 in the aforementioned operation 604 or operation 606 may be the same, or may be different. In other words, a quantity of sub-groups generated by the data pattern analysis circuit 115 in the operation 610 and a quantity of sub-groups generated by the data pattern analysis circuit 115 in the aforementioned operation 604 or operation 606 may be the same, or may be different.

Similarly, after performing the aforementioned operation 610, if there still exists other attribute in the data group 330 which needs to be utilized as an analysis basis, then the data pattern analysis circuit 115 may repeat the operation 610 to analyze a data pattern of other attribute recorded in all activity records in the data group 330. On the contrary, if there exists no attribute in the data group 330 which needs to be utilized as an analysis basis, then the data pattern analysis circuit 115 may perform the aforementioned operation 608.

The data pattern analysis circuit 115 may perform the aforementioned operation 218 of FIG. 2 by adopting the aforementioned method of FIG. 6 to analyze the data pattern a plurality of activity records in the data group 330 within the data collection period, so as to generate multiple reference data sets corresponding to the data group 330 (e.g., the exemplary reference data sets 340, 342, and 344 in FIG. 3).

Figure 7:
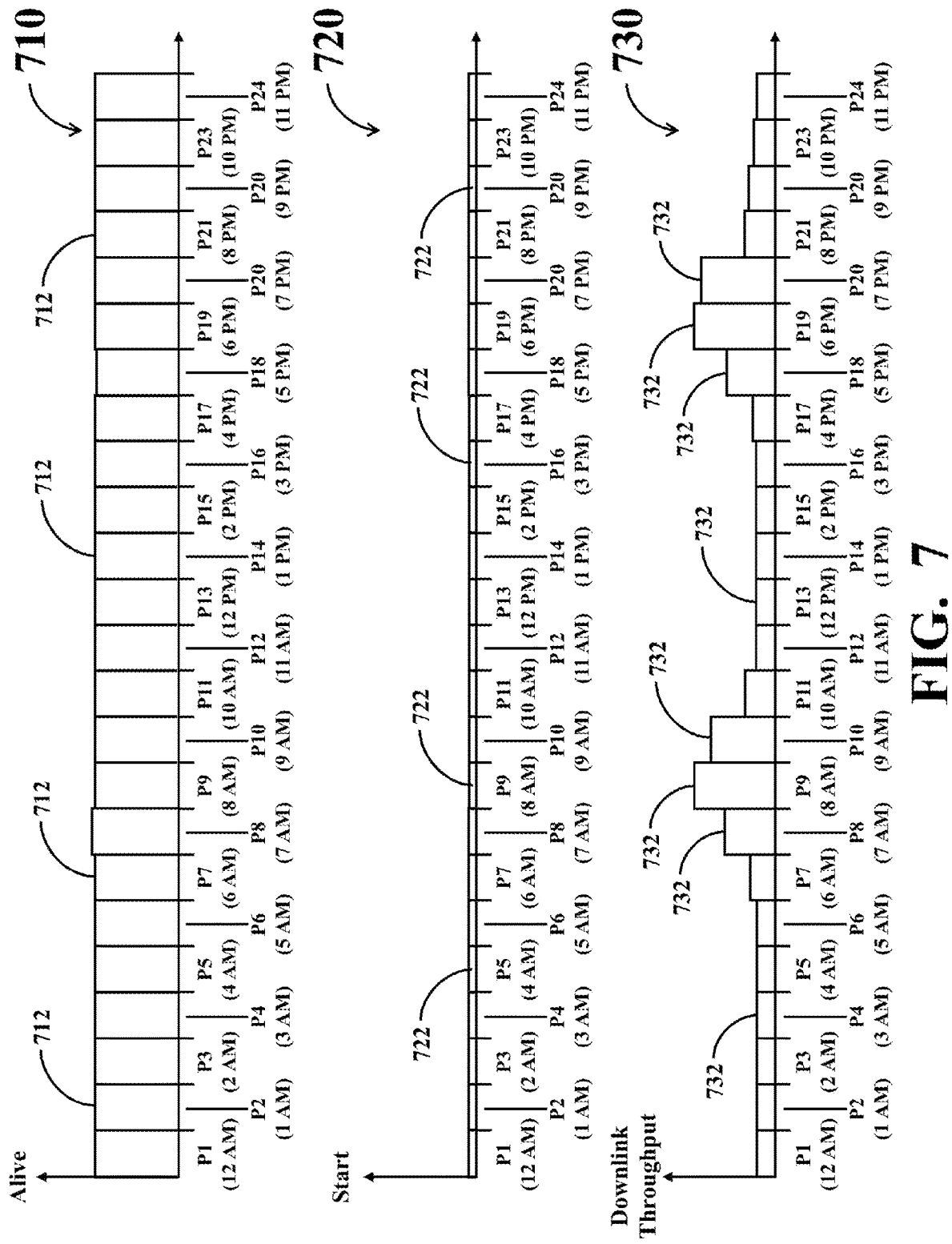
FIGS. 7-9 show simplified schematic diagrams of corresponding statistic graphs of generated reference data sets according to different embodiments of the present disclosure.
Figure 8:
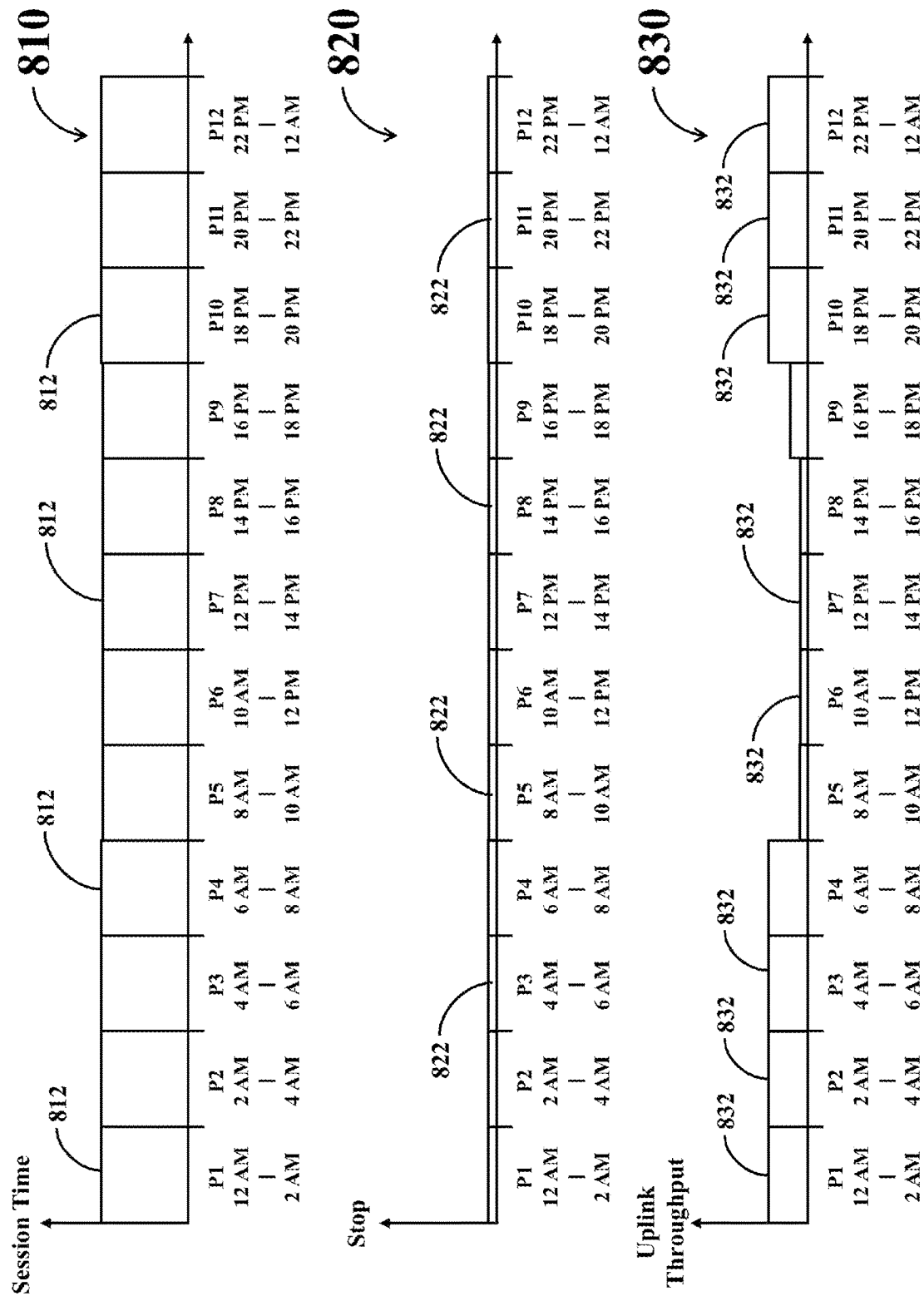
Figure 9:
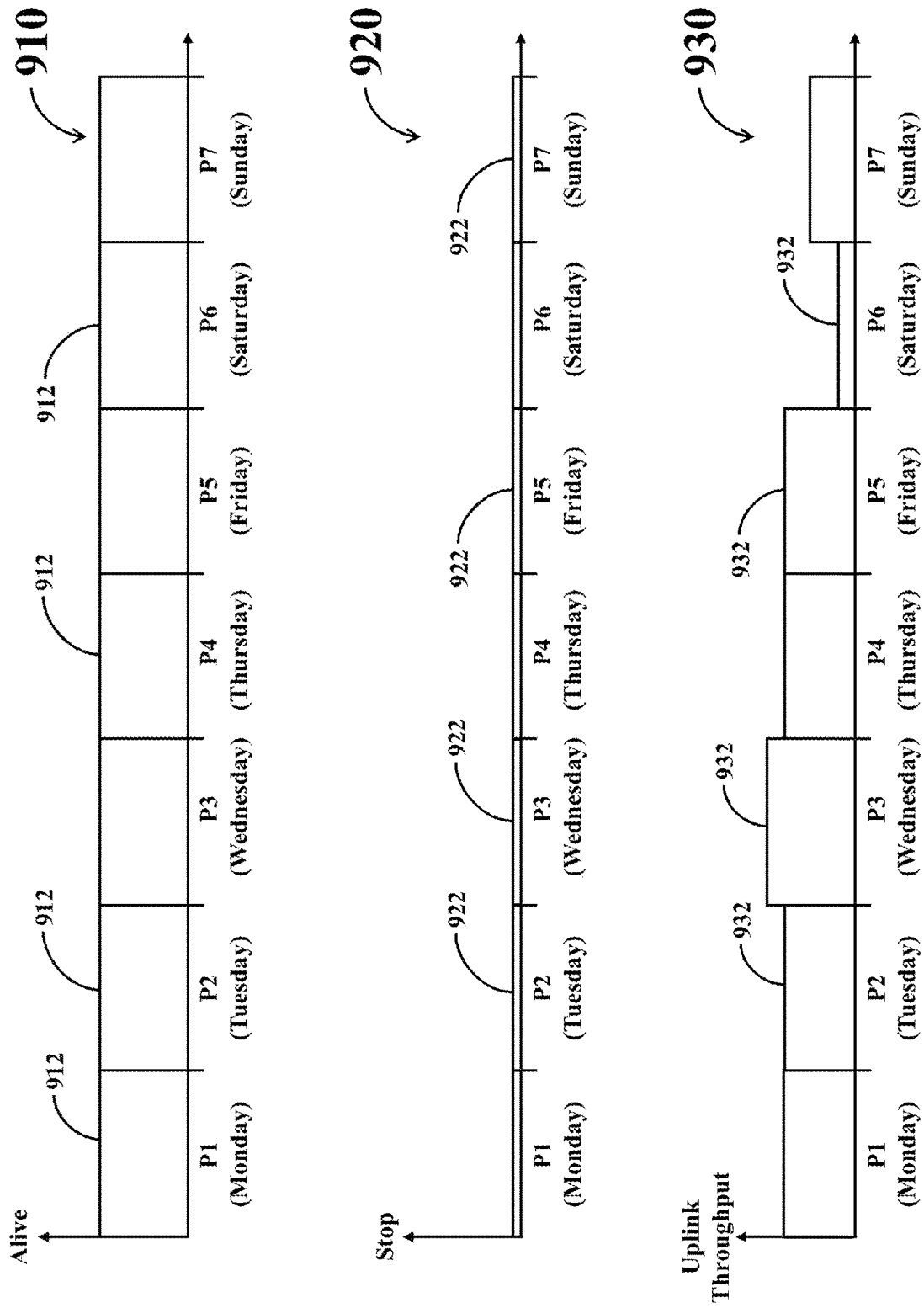

As can be appreciated from the foregoing descriptions, contents of each reference data sets corresponding to the data group 330 is a set of statistical data, and this set of statistical data may equivalently be described in a form of a corresponding statistic graph. To help understanding, this will be further described in the following by reference to examples in FIGS. 7-9. FIGS. 7-9 show simplified schematic diagrams of corresponding statistic graphs of resulting reference data sets according to different embodiments of the present disclosure.

For example, in the embodiment of FIG. 7, the data pattern analysis circuit 115 may divide all activity records in the data group 330 into 24 sub-groups respectively corresponding to 24 hours per day. The data pattern analysis circuit 115 may respectively calculate a sum of a quantity of activity records, whose device status is "Alive", in respective sub-groups, and may consolidate calculation results of the 24 sub-groups into a set of statistical data, so as to be a reference data set 340 of the data group 330 with respect to the operation status "Alive". Contents of the reference data set 340 may equivalently be described in the form of a statistic graph 710 in FIG. 7, where each data statistic result 712 in the form of a bar in the statistic graph 710 represents a sum of a quantity of activity records whose device status is "Alive" in a specific statistical period. As shown in FIG. 7, the statistic graph 710 shows that the respective heights of the data statistic results 712 in different statistical periods are close to a first value, which means that the respective total quantities of activity records whose device status is "Alive" in different statistical periods are close to the first value. Such analysis results represent that among multiple IoT devices corresponding to the data group 330, the respective total quantities of IoT devices which stay in the "Alive" status in different statistical periods are steadily maintained around the first value.

In addition, the data pattern analysis circuit 115 may respectively calculate a sum of a quantity of activity records, whose device status is "Start", in respective sub-groups, and may consolidate calculation results of the aforementioned 24 sub-groups into another set of statistical data, so as to be a reference data set 342 of the data group 330 with respect to the operation status "Start". Contents of the reference data set 342 may equivalently be described in the form of a statistic graph 720 in FIG. 7, where each data statistic result 722 in the form of a bar in the statistic graph 720 represents a sum of a quantity of activity records whose device status is "Start" in a specific statistical period. As shown in FIG. 7, the statistic graph 720 shows that the respective heights of the data statistic results 722 in different statistical periods are similar with each other and relatively short, which means that the respective total quantities of activity records whose device status is "Start" in different statistical periods are similarly small. Such analysis results represent that among multiple IoT devices corresponding to the data group 330, the respective total quantities of IoT devices which enter the "Start" status in different statistical periods are similarly small.

In addition, the data pattern analysis circuit 115 may also respectively calculate a sum of the downlink throughput recorded in all activity records in respective sub-groups, and may consolidate calculation results of the aforementioned 24 sub-groups into another set of statistical data, so as to be a reference data set 344 of the data group 330 with respect to the downlink throughput. Contents of the reference data set 344 may equivalently be described in the form of a statistic graph 730 in FIG. 7, where each data statistic result 732 in the form of a bar in the statistic graph 730 represents a sum of the downlink throughput recorded in all activity records in a specific statistical period. As shown in FIG. 7, the statistic graph 730 shows that the data statistic results 732 with respect to 7 AM to 9 AM each day and the data statistic results 732 with respect to 5 PM to 7 PM each day are explicitly higher than the data statistic results 732 with respect to other statistical periods, which means that the total downlink throughput recorded in all activity records with respect to 7 AM to 9 AM each day and that recorded in all activity records with respect to 5 PM to 7 PM each day are explicitly higher than that recorded in all activity records with respect to other statistical periods. Such analysis results represent that the multiple IoT devices corresponding to the data group 330 have apparently higher downlink throughput from 7 AM to 9 AM each day and from 5 PM to 7 PM each day than in other statistical periods.

If the aforementioned multiple activity records in the data group 330 respectively corresponds to multiple IoT devices 104 in the target IoT system 101, and the target IoT system 101 is a traffic signal management system, and the numerous IoT devices 104 in the target IoT system 101 are multiple traffic signal monitoring circuits respectively arranged at different locations, the statistic graphs 710, 720, and 730 illustrated in FIG. 7 to some extent may be utilized to present a behavior characteristic among numerous traffic signals in the traffic signal management system in a normal operation situation.

For another example, in the embodiment of FIG. 8, the data pattern analysis circuit 115 may divide all activity records in the data group 330 into 12 sub-groups respectively corresponding to 12 statistical periods per day (where each statistical period is 2 hours). The data pattern analysis circuit 115 may respectively calculate an average of the session times recorded in all activity records in respective sub-groups, and may consolidate calculation results of the 12 sub-groups into a set of statistical data, so as to be a reference data set 340 of the data group 330 with respect to the session time. Contents of the reference data set 340 may equivalently be described in the form of a statistic graph 810 in FIG. 8, where each data statistic result 812 in the form of a bar in the statistic graph 810 represents an average of session time recorded in all activity records in a specific statistical period. As shown in FIG. 8, the statistic graph 810 shows that the respective heights of the data statistic results 812 in different statistical periods are close to a second value, which means that an average of session time recorded in all activity records in different statistical periods are close to the second value. Such analysis results represent that the respective average session times of the multiple IoT devices corresponding to the data group 330 in different statistical periods are steadily maintained around the second value.

In addition, the data pattern analysis circuit 115 may respectively calculate a sum of a quantity of activity records, whose device status is "Stop", in respective sub-groups, and may consolidate calculation results of the aforementioned 12 sub-groups into another set of statistical data, so as to be a reference data set 342 of the data group 330 with respect to the operation status "Stop". Contents of the reference data set 342 may equivalently be described in the form of a statistic graph 820 in FIG. 8, where each data statistic result 822 in the form of a bar in the statistic graph 820 represents a sum of a quantity of activity records whose device status is "Stop" in a specific statistical period. As shown in FIG. 8, the statistic graph 820 shows that the respective heights of the data statistic results 822 in different statistical periods are similar with each other and relatively short, which means that the respective total quantities of activity records whose device status is "Stop" in different statistical periods are similarly small. Such analysis results represent that among multiple IoT devices corresponding to the data group 330, the respective total quantities of IoT devices which enter the "Stop" status in different statistical periods are similarly small.

In addition, the data pattern analysis circuit 115 may also respectively calculate a sum of the uplink throughput recorded in all activity records in respective sub-groups, and may consolidate calculation results of the aforementioned 12 sub-groups into another set of statistical data, so as to be a reference data set 344 of the data group 330 with respect to the uplink throughput. Contents of the reference data set 344 may equivalently be described in the form of a statistic graph 830 in FIG. 8, where each data statistic result 832 in the form of a bar in the statistic graph 830 represents a sum of the uplink throughput recorded in all activity records in a specific statistical period. As shown in FIG. 8, the statistic graph 830 shows that the data statistic results 832 with respect to 12 AM to 8 AM each day and the data statistic results 832 with respect to 6 PM to 12 AM each day are explicitly higher than the data statistic results 832 with respect to other statistical periods, which means that the sum of the uplink throughput recorded in all activity records with respect to 6 PM to 8 AM next day are explicitly higher than the data statistic results 832 with respect to other statistical periods. Such analysis results represent that the multiple IoT devices corresponding to the data group 330 have apparently higher uplink throughput from 6 PM to 8 AM next day than in other statistical periods.

If the aforementioned multiple activity records in the data group 330 respectively corresponds to multiple IoT devices 104 in the target IoT system 101, and the target IoT system 101 is a smart street light system, and the numerous IoT devices 104 in the target IoT system 101 are multiple smart street lights respectively arranged at different locations, the statistic graphs 810, 820, and 830 illustrated in FIG. 8 to some extent may be utilized to present a behavior characteristic among numerous street lights in the smart street light system in a normal operation situation.

For another example, in the embodiment of FIG. 9, the data pattern analysis circuit 115 may divide all activity records in the data group 330 into 7 sub-groups respectively corresponding to 7 days per week. The data pattern analysis circuit 115 may respectively calculate a sum of a quantity of activity records, whose device status is "Alive", in respective sub-groups, and may consolidate calculation results of the 7 sub-groups into a set of statistical data, so as to be a reference data set 340 of the data group 330 with respect to the operation status "Alive". Contents of the reference data set 340 may equivalently be described in the form of a statistic graph 910 in FIG. 9, where each data statistic result 912 in the form of a bar in the statistic graph 910 represents a sum of a quantity of activity records whose device status is "Alive" in a specific statistical period. As shown in FIG. 9, the statistic graph 910 shows that the respective heights of the data statistic results 912 in different statistical periods are close to a third value, which means that the respective total quantities of activity records whose device status is "Alive" in different statistical periods are all close to the third value. Such analysis results represent that among multiple IoT devices corresponding to the data group 330, the respective total quantities of activity records whose device status is "Alive" in different statistical periods are steadily maintained around the third value.

In addition, the data pattern analysis circuit 115 may respectively calculate a sum of a quantity of activity records, whose device status is "Stop", in respective sub-groups, and may consolidate calculation results of the aforementioned 7 sub-groups into another set of statistical data, so as to be a reference data set 342 of the data group 330 with respect to the operation status "Stop". Contents of the reference data set 342 may equivalently be described in the form of a statistic graph 920 in FIG. 9, where each data statistic result 922 in the form of a bar in the statistic graph 920 represents a sum of a quantity of activity records whose device status is "Stop" in a specific statistical period. As shown in FIG. 9, the statistic graph 920 shows that the respective heights of the data statistic results 922 in different statistical periods are similar with each other and relatively short, which means that the respective total quantities of activity records whose device status is "Stop" in different statistical periods are similarly small. Such analysis results represent that among multiple IoT devices corresponding to the data group 330, the respective total quantities of activity records whose device status is "Stop" in different statistical periods are similarly small.

In addition, the data pattern analysis circuit 115 may also respectively calculate a sum of the uplink throughput recorded in all activity records in respective sub-groups, and may consolidate calculation results of the aforementioned 7 sub-groups into another set of statistical data, so as to be a reference data set 344 of the data group 330 with respect to the uplink throughput. Contents of the reference data set 344 may equivalently be described in the form of a statistic graph 930 in FIG. 9, where each data statistic result 932 in the form of a bar in the statistic graph 930 represents a sum of the uplink throughput recorded in all activity records in a specific statistical period. As shown in FIG. 9, the statistic graph 930 shows that the data statistic results 932 in Saturday and Sunday are explicitly lower than the data statistic results 932 in other 5 days, which means that the sum of the uplink throughput recorded in all activity records in Saturday and Sunday are explicitly lower than that in other statistical periods. Such analysis results represent that the multiple IoT devices corresponding to the data group 330 have apparently lower uplink throughput in Saturday and Sunday than in other 5 days.

If the aforementioned multiple activity records in the data group 330 respectively corresponds to multiple IoT devices 104 in the target IoT system 101, and the target IoT system 101 is a smart electricity meter system, and the numerous IoT devices 104 in the target IoT system 101 are multiple smart electricity meters respectively arranged in different buildings, the statistic graphs 910, 920, and 930 illustrated in FIG. 9 to some extent may be utilized to present a behavior characteristic among numerous smart electricity meters in the smart electricity meter system in a normal operation situation.

As can be appreciated from the foregoing descriptions, each reference data set corresponding to the data group 330 may be utilized to present a change pattern of a related statistical result (e.g., a sum, an average, a moving sum, or a moving average) of a specific analysis basis (i.e., a specific attribute) in the activity records in the data group 330 with respect to multiple different statistical periods within a data collection period.

The data pattern analysis circuit 115 may analyze the data patterns of activity records in other respective data groups so as to generate reference data sets corresponding to the respective data groups within the data collection period by adopting the aforementioned method of FIG. 6. For example, the data pattern analysis circuit 115 may analyze a data pattern of a plurality of activity records in the data group 332 with respect to the data collection period so as to generate multiple reference data sets corresponding to the data group 332 by adopting the method of FIG. 6. Similarly, the data pattern analysis circuit 115 may analyze a data pattern of a plurality of activity records in the data group 334 with respect to the data collection period so as to generate multiple reference data sets corresponding to the data group 334 by adopting the method of FIG. 6.

As described previously, the data pattern analysis circuit 115 may utilize appropriate data format to store multiple reference data sets corresponding to the respective data groups in the storage circuit 113.

After generating one or more reference data sets corresponding to the respective data groups, the IoT operations monitoring system 100 may dynamically inspect operations of multiple IoT devices in the target IoT systems 101, 102, and 103.

Figure 10:
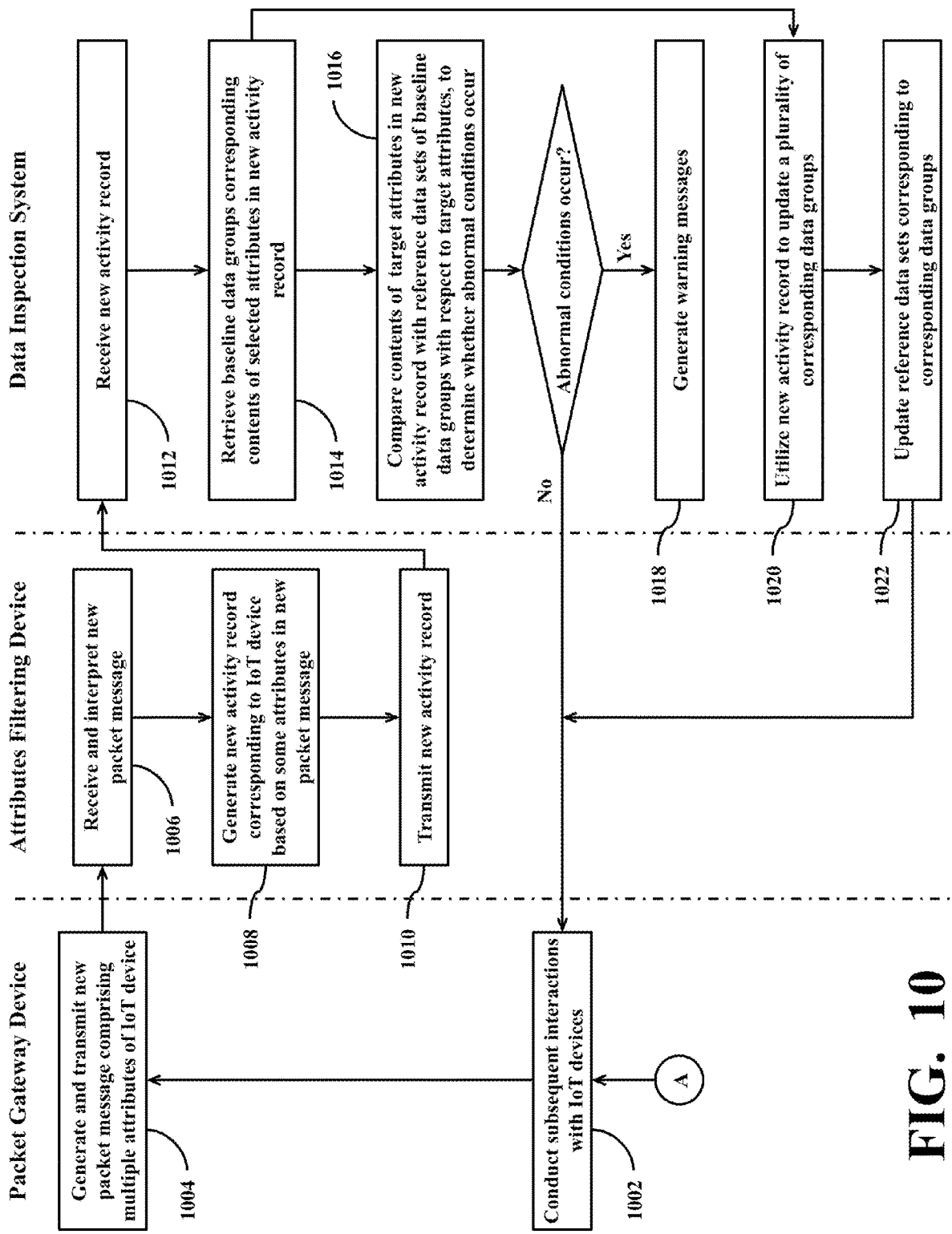
FIG. 10 shows a simplified flowchart of a method for inspecting whether abnormal conditions occur in IoT operations according to one embodiment of the present disclosure.
Figure 11:
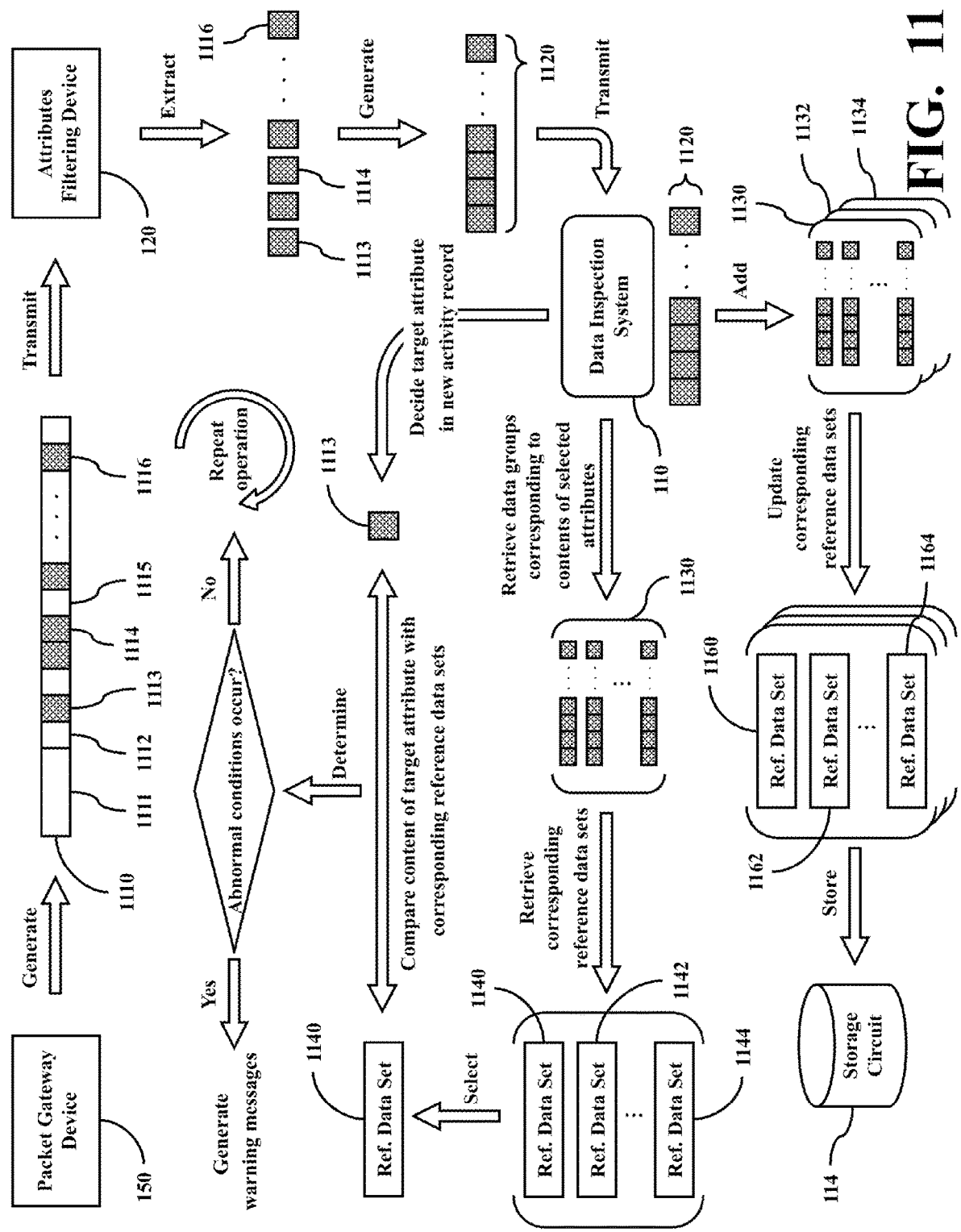
FIG. 11 shows a simplified data flow schematic diagram of inspecting whether abnormal conditions occur in IoT operations according to one embodiment of the present disclosure.

The operations of dynamically inspecting whether abnormal conditions occur in the aforementioned target IoT systems 101, 102, and 103 conducted by the IoT operations monitoring system 100 will be further described in the following by reference to FIGS. 10-11. FIG. 10 shows a simplified flowchart of a method for inspecting whether abnormal conditions occur in IoT operations according to one embodiment of the present disclosure. FIG. 11 shows a simplified data flow schematic diagram of inspecting whether abnormal conditions occur in IoT operations according to one embodiment of the present disclosure.

For the convenience of description, the operations of inspecting whether abnormal conditions occur in the operations of the IoT devices 104 in the target IoT system 101 will be taken as an example for description in the following.

In operations, the packet gateway device 150 performs the operation 1002 of FIG. 10 to conduct subsequent interactions with the respective IoT devices 104 in the target IoT system 101 through the base station 152. The operations conducted by the packet gateway device 150 in the operation 1002 are similar to the operations conducted by the packet gateway device 150 in the aforementioned operation 202 and operation 204 of FIG. 2. For the sake of brevity, those descriptions will not be repeated here.

During the operation of the aforementioned target IoT system 101, the packet gateway device 150 intermittently receives related data transmitted from different IoT devices 104, and intermittently performs the operation 1004.

In the operation 1004, the packet gateway device 150 generates a new packet message 1110 comprising multiple attributes of a specific IoT device (hereinafter referred to as target IoT device 104), and transmits the new packet message 1110 to the corresponding attributes filtering device 120. The packet gateway device 150 may utilize appropriate data format to integrate multiple attributes related to the target IoT device 104 into the new packet message 1110 corresponding to the target IoT device 104. As shown in FIG. 11, the new packet message 1110 comprises a header 1111 and the multiple attributes stored in different data fields (e.g., the exemplary attributes 1112, 1113, 1114, 1115, and 1116 in FIG. 11).

The method for generating the new packet message 1110 in the operation 1004 adopted by the packet gateway device 150 may be the same as the method for generating the packet message 310 in the aforementioned operation 206. In other words, attributes recorded in the new packet message 1110 by the packet gateway device 150 may comprise various related data, such as a packet time, a session ID, a network address of the target IoT device 104, a device ID of the target IoT device 104, a group ID corresponding to the target IoT device 104 (e.g., an APN), a device status of the target IoT device 104, an uplink throughput of the target IoT device 104, a downlink throughput of the target IoT device 104, a base station ID of the base station 152, and/or a service type of the IoT device 104. In the embodiment where the target IoT device 104 is equipped with a SIM, the aforementioned device ID may be the SIM number.

In some embodiments, the attributes recorded in the new packet message 1110 by the packet gateway device 150 may further comprise a packet gateway ID of the packet gateway device 150 (e.g., the network address of the packet gateway device 150), and/or a session time of the target IoT device 104.

In practice, the packet gateway device 150 may further record other attributes or data related to the target IoT device 104 in the new packet message 1110 according to the application purpose of the target IoT system 101. The new packet message 1110 comprising the multiple attributes of the target IoT device 104 and generated by the packet gateway device 150 may be realized with packets of various appropriate formats. Similar to the aforementioned embodiment in FIG. 2, for example, the new packet message 1110 generated by the packet gateway device 150 may be realized with an Accounting-Request Packet.

In the operation 1006, the data processing circuit 122 of the attributes filtering device 120 receives and interprets the new packet message 1110 transmitted from the packet gateway device 150 through the network 154.

Then, the data processing circuit 122 may perform the operation 1008 to generate a new activity record 1120 corresponding to the target IoT device 104 based on some attributes in the new packet message 1110.

The method for generating the new activity record 1120 in the operation 1008 adopted by the data processing circuit 122 may be the same as the method for generating the activity record 320 in the aforementioned operation 210. As shown in FIG. 11, after the data processing circuit 122 receives the new packet message 1110, the data processing circuit 122 interprets and extracts the aforementioned multiple attributes recorded in the new packet message 1110. Then, the data processing circuit 122 filters some attributes (e.g., the exemplary attributes 1113, 1114, and 1116 in FIG. 11) from the extracted multiple attributes, and generates a new activity record 1120 corresponding to the target IoT device 104 based on the attributes.

In other words, the new activity record 1120 generated by the data processing circuit 122 does not comprise all attributes recorded in the new packet message 1110. Instead, the new activity record 1120 generated by the data processing circuit 122 only comprises some attributes recorded in the new packet message 1110.

For example, the data processing circuit 122 may utilize appropriate data format to integrate a device ID, a group ID, a device status, an uplink throughput, a downlink throughput, and a base station ID recorded in the new packet message 1110 into the new activity record 1120 corresponding to the target IoT device 104.

In some embodiments, the data processing circuit 122 may further integrate a packet gateway ID, and/or a session time recorded in the new packet message 1110 into the new activity record 1120 corresponding to the target IoT device 104.

Obviously, the quantity of the attributes recorded in the new activity record 1120 generated by the data processing circuit 122 is less than the quantity of the attributes recorded in the new packet message 1110.

In the operation 1010, the data transmission circuit 124 of the attributes filtering device 120 may transmit the new activity record 1120 generated by the data processing circuit 122 to the data inspection system 110 through the network 182.

In this situation, the communication circuit 111 of the data inspection system 110 performs the operation 1012 to receive the new activity record 1120 transmitted from the attributes filtering device 120. The data interpreting circuit 112 may interpret the new activity record 1120 received by the communication circuit 111 to extract multiple attributes recorded in the new activity record 1120.

In practice, the data transmission circuit 124 may transmit the new activity record 1120 to the data inspection system 110 once the data processing circuit 122 generates the new activity record 1120.

Alternatively, the data transmission circuit 124 may transmit the new activity record 1120 along with other new activity records to the data inspection system 110 on a batch basis until a quantity of the new activity records generated by the data processing circuit 122 accumulates to a predetermined quantity (e.g., 10, 30, 50, 100, 300, 500, 700, 1000, 1500, 2000, or an appropriate quantity).

Alternatively, the data transmission circuit 124 may intermittently or periodically perform the operation 1010. For example, the data transmission circuit 124 may be arranged to operably transmit periodically the new activity record 1120 and the currently accumulated new activity records to the data inspection system 110 every second, every three seconds, every five seconds, every ten seconds, every fifteen seconds, every thirty seconds, every sixty seconds, every one-hundred seconds, every three minutes, every five minutes, every ten minutes, every twenty minutes, every thirty minutes, every hour, every one and half hour, or other appropriate time intervals.

In the operation 1014, the abnormal inspection circuit 116 may retrieve one or more data groups corresponding to one or more selected attributes in the new activity record 1120 from the storage circuit 113 to be one or more baseline data groups.

As described previously, the data classification circuit 114 would classify the multiple activity records generated by the attributes filtering devices 120, 130, and 140 based on contents of a certain quantity of attributes which can be utilized as a classification basis (e.g., the aforementioned base station ID, group ID, packet gateway ID, and/or site ID) to form multiple data groups, so that different data groups respectively correspond to different contents of an attribute, but all activity records in the same data group have identical content of a selected attribute.

In the aforementioned embodiment, for example, the data group 330 generated by the data classification circuit 114 is a data group corresponding to the base station ID BS-152, and the contents of the respective base station IDs recorded in all activity records in the data group 330 are the base station ID BS-152. The data group 332 is a data group corresponding to the identification data APN-A, and the contents of the respective group IDs recorded in all activity records in the data group 332 are the identification data APN-A. The data group 334 is a data group corresponding to the identification data APN-B, and the contents of the respective group IDs recorded in all activity records in the data group 334 are the identification data APN-B.

The selected attribute referred to in the operation 1014 is selected from the aforementioned attributes which can be utilized as a classification basis (e.g., a base station ID, a group ID, a packet gateway ID, and/or a site ID). In operations, the abnormal inspection circuit 116 may decide specific items of the target attribute and a quantity of the selected attributes according to predetermined rules or comparing subjects selected by the user, and may retrieve baseline data groups corresponding to the contents of the selected attributes from the storage circuit 113.

For example, if the selected attribute is a group ID, and a content of the group ID recorded in the new activity record 1120 corresponds to an identification data APN-A of the first specific client, then the abnormal inspection circuit 116 may retrieve the data group corresponding to the identification data APN-A from the storage circuit 113 to be a baseline data group.

For another example, if the selected attribute is a site ID, and a content of the site ID recorded in the new activity record 1120 corresponds to a site ID S 1-ID of a site S 1, then the abnormal inspection circuit 116 may retrieve the data group corresponding to the site ID Sl-ID from the storage circuit 113 to be a baseline data group.

For another example, if the selected attribute is a base station ID, and a content of the base station ID recorded in the new activity record 1120 corresponds to a base station ID BS-152 of a base station 152, then the abnormal inspection circuit 116 may retrieve the data group corresponding to the base station ID BS-152 from the storage circuit 113 to be a baseline data group.

For another example, if the selected attribute is a packet gateway ID, and a content of the packet gateway ID recorded in the new activity record 1120 corresponds to a packet gateway ID GW-150 of a packet gateway device 150, then the abnormal inspection circuit 116 may retrieve the data group corresponding to the packet gateway ID GW-150 from the storage circuit 113 to be a baseline data group.

Activity records in respective baseline data groups are utilized to be comparing subjects when an abnormal analysis is performed on the new activity record 1120 in subsequent operations.

For the convenience of description, it is assumed hereinafter that the abnormal inspection circuit 116 retrieves a plurality of corresponding baseline data groups (e.g., the exemplary baseline data groups 1130, 1132, and 1134 in FIG. 11) from the storage circuit 113 according to contents of a plurality of selected attributes in the new activity record 1120.

In the operation 1016, the abnormal inspection circuit 116 may compare contents of one or more target attributes in the new activity record 1120 with reference data sets of the baseline data groups 1130, 1132, and 1134 with respect to the one or more target attributes retrieved in the operation 1014, so as to determine whether abnormal conditions occur or not.

As described previously, the data pattern analysis circuit 115 would perform data pattern analysis on activity records in respective data groups, and would generate one or more reference data sets corresponding to the respective data groups, and contents of each reference data sets corresponding to the respective data group is a set of statistical data. The aforementioned set of statistical data can be utilized to present a change pattern of a related statistical result (e.g., a sum, an average, a moving sum, a moving average, or the like) of a specific target attribute (e.g., a device status, an uplink throughput, a downlink throughput, and/or a session time) which can be utilized to be an analysis basis and recorded in the activity records within respective data groups with respect to multiple different statistical periods within a data collection period.

Therefore, each of the baseline data groups 1130, 1132, and 1134 retrieved by the abnormal inspection circuit 116 in the operation 1014 comprises one or more corresponding reference data sets. The aforementioned one or more corresponding reference data sets can be utilized to present a change pattern of a related statistical result of a specific target attribute in the activity records in respective baseline data groups with respect to multiple different statistical periods within a data collection period.

The target attribute referred to in the operation 1016 is selected from the aforementioned attributes which can be utilized as an analysis basis (e.g., a device status, an uplink throughput, a downlink throughput, and/or a session time). In operations, the abnormal inspection circuit 116 may decide specific items of the target attribute and a quantity of the target attributes according to predetermined rules or analysis items selected by the user, and may retrieve reference data sets corresponding to the target attributes from the storage circuit 113.

As shown in FIG. 11, it is assumed that the activity records in the baseline data group 1130 are subjects to be compared with by the abnormal inspection circuit 116. The abnormal inspection circuit 116 may utilize an attribute, which needs to be analyzed, in the new activity record 1120 to be a target attribute 1113, and may retrieve a reference data set 1140 of the baseline data group 1130 with respect to the target attribute 1113 from the storage circuit 113. Then, the abnormal inspection circuit 116 may compare contents of the target attribute 1113 recorded in the new activity record 1120 with the statistical data of the reference data set 1140, so as to determine whether a difference between the contents of the target attribute 1113 and the related statistical data of the reference data set 1140 exceeds a predetermined threshold or not.

For example, if the item to be analyzed is the uplink throughput, and subjects to be compared with are the activity records in the baseline data group 1130, then the abnormal inspection circuit 116 may utilize the uplink throughput to be a target attribute, and may retrieve a reference data set of the baseline data group 1130 with respect to the uplink throughput (e.g., the reference data set 1142 in FIG. 11, hereinafter referred to as a first baseline data set) from the storage circuit 113. Then, the abnormal inspection circuit 116 may compare a content of the uplink throughput recorded in the new activity record 1120 with the statistical data of the first baseline data set, so as to determine whether a difference between the content of the uplink throughput and the statistical data of related statistical periods in the first baseline data set exceeds a first predetermined threshold value (e.g., 10%, 15%, 20%, 30%, 40%, 50%, a specific throughput volume, or the like) or not.

After comparing contents of the uplink throughput recorded in the new activity record 1120 with the statistical data in the first reference data set, if there still exist other item to be analyzed in the new activity record 1120, then the abnormal inspection circuit 116 may adopt the aforementioned approach to perform comparing operations.

For example, if the item to be analyzed is the uplink throughput, and subjects to be compared with are the activity records in the baseline data group 1132, then the abnormal inspection circuit 116 may utilize the uplink throughput to be a target attribute, and may retrieve a reference data set of the baseline data group 1132 with respect to the uplink throughput (hereinafter referred to as a second baseline data set) from the storage circuit 113. Then, the abnormal inspection circuit 116 may compare a content of the uplink throughput recorded in the new activity record 1120 with the statistical data of the second baseline data set, so as to determine whether a difference between the content of the uplink throughput and the statistical data of related statistical periods in the second baseline data set exceeds the aforementioned first predetermined threshold value or not.

For another example, if the item to be analyzed is the downlink throughput, and subjects to be compared with are the activity records in the baseline data group 1130, then the abnormal inspection circuit 116 may utilize the downlink throughput to be a target attribute, and may retrieve a reference data set of the baseline data group 1130 with respect to the downlink throughput (e.g., the reference data set 1144 in FIG. 11, hereinafter referred to as a third baseline data set) from the storage circuit 113. Then, the abnormal inspection circuit 116 may compare a content of the downlink throughput recorded in the new activity record 1120 with the statistical data of the third baseline data set, so as to determine whether a difference between the content of the downlink throughput and the statistical data of related statistical periods in the third baseline data set exceeds a second predetermined threshold value (e.g., 5%, 10%, 15%, 20%, 25%, 30%, 40%, a specific throughput volume, or the like) or not.

For another example, if the item to be analyzed is the downlink throughput, and subjects to be compared with are the activity records in the baseline data group 1134, then the abnormal inspection circuit 116 may utilize the downlink throughput to be a target attribute, and may retrieve a reference data set of the baseline data group 1134 with respect to the downlink throughput (hereinafter referred to as a fourth baseline data set) from the storage circuit 113. Then, the abnormal inspection circuit 116 may compare a content of the downlink throughput recorded in the new activity record 1120 with the statistical data of the fourth baseline data set, so as to determine whether a difference between the content of the downlink throughput and the statistical data of related statistical periods in the fourth baseline data set exceeds the aforementioned second predetermined threshold value or not.

For another example, if the item to be analyzed is the session time, and subjects to be compared with are the activity records in the baseline data group 1132, then the abnormal inspection circuit 116 may utilize the session time to be a target attribute, and may retrieve a reference data set of the baseline data group 1132 with respect to the session time (hereinafter referred to as a fifth baseline data set) from the storage circuit 113. Then, the abnormal inspection circuit 116 may compare a content of the session time recorded in the new activity record 1120 with the statistical data of the fifth baseline data set, so as to determine whether a difference between the content of the session time and the statistical data of related statistical periods in the fifth baseline data set exceeds a third predetermined threshold value (e.g., 15%, 20%, 30%, 50%, 80%, 100%, a specific time value, or the like) or not.

For another example, if the item to be analyzed is the session time, and subjects to be compared with are the activity records in the baseline data group 1134, then the abnormal inspection circuit 116 may utilize the session time to be a target attribute, and may retrieve a reference data set of the baseline data group 1134 with respect to the session time (hereinafter referred to as a sixth baseline data set) from the storage circuit 113. Then, the abnormal inspection circuit 116 may compare a content of the session time recorded in the new activity record 1120 with the statistical data of the sixth baseline data set, so as to determine whether a difference between the content of the session time and the statistical data of related statistical periods in the sixth baseline data set exceeds the aforementioned third predetermined threshold value or not.

If the item to be analyzed is other attribute, then the abnormal inspection circuit 116 may adopt the aforementioned approach to perform related comparison.

In one embodiment, the abnormal inspection circuit 116 may determine abnormal conditions occur in the operations of the target IoT device 104 corresponding to the new activity record 1120 when a difference between the content of a single target attribute recorded in the new activity record 1120 and a single corresponding reference data set exceeds a related threshold.

In another embodiment, the abnormal inspection circuit 116 may determine abnormal conditions occur in the operations of the target IoT device 104 corresponding to the new activity record 1120 only when the difference between the content of a single target attribute recorded in the new activity record 1120 and multiple corresponding reference data sets exceeds a related threshold.

In another embodiment, the abnormal inspection circuit 116 may determine abnormal conditions occur in the operations of the target IoT device 104 corresponding to the new activity record 1120 only when the respective difference between the content of multiple target attributes recorded in the new activity record 1120 and multiple corresponding reference data sets exceeds related thresholds.

If the abnormal inspection circuit 116 determines that abnormal condition does not occur in operations of the target IoT device 104, then the target IoT system 101, the packet gateway device 150, the attributes filtering device 120, and the data inspection system 110 may repeat the aforementioned operations of FIG. 10. On the contrary, if the abnormal inspection circuit 116 determines that abnormal conditions occur in operations of the target IoT device 104, then the abnormal inspection circuit 116 performs the operation 1018 of FIG. 10.

In the operation 1018, the abnormal inspection circuit 116 generates one or more warning messages corresponding to the target IoT device 104 or the target IoT system 101. The user graphical interface generating circuit 117 displays the warning messages generated by the abnormal inspection circuit 116 for the user by using appropriate visual approaches. For example, the user graphical interface generating circuit 117 may generate related warning texts, warning patterns, and/or warning images, and may transmit the aforementioned warning texts, warning patterns, and/or warning images to the client device 192 and/or the client device 194 through the network 184, so that the operator, administrator, auditor and/or other user of the target IoT system 101 can be informed of related situations.

On the other hand, after the abnormal inspection circuit 116 retrieves a plurality of baseline data groups 1130, 1132, and 1134 corresponding to contents of a plurality of selected attributes in the new activity record 1120 in the aforementioned operation 1014, the data classification circuit 114 further performs the operation 1020 of FIG. 10, and the data pattern analysis circuit 115 further performs the operation 1022 of FIG. 10.

In the operation 1020, the data classification circuit 114 may classify the new activity record 1120 based on contents of multiple attributes which can be utilized as classification basis, so as to utilize the new activity record 1120 to update contents of a plurality of corresponding data groups including the aforementioned baseline data groups 1130, 1132, and 1134. The data classification circuit 114 may adopt the approach of the aforementioned operation 216 to classify the new activity record 1120 based on contents of the multiple attributes which can be utilized as classification basis, and to retrieve a plurality of data groups corresponding to the new activity record 1120, and may add the new activity record 1120 into individual data groups, and may at the same time remove the oldest activity record in the individual data groups. For example, the data classification circuit 114 may add the new activity record 1120 into the baseline data group 1130, and may remove the oldest activity record in the baseline data group 1130. For another example, the data classification circuit 114 may add the new activity record 1120 into the baseline data group 1132, and may remove the oldest activity record in the baseline data group 1132. Similarly, the data classification circuit 114 may add the new activity record 1120 into the baseline data group 1134, and may remove the oldest activity record in the baseline data group 1134.

The data classification circuit 114 stores corresponding updated data groups in the storage circuit 113, so that the abnormal inspection circuit 116 may utilize those updated data groups in subsequent abnormal analysis operations.

In the operation 1022, the data pattern analysis circuit 115 may update multiple reference data sets corresponding to the corresponding data groups of the new activity record 1120. The data pattern analysis circuit 115 may adopt the approach of the aforementioned operation 218 to perform data pattern analysis again on activity records in respective data groups into which the new activity record 1120 is added, and may update one or more reference data sets corresponding to the respective data groups. For example, the data pattern analysis circuit 115 may perform data pattern analysis again on activity records in the updated baseline data group 1130, and may generate one or more updated reference data sets corresponding to the baseline data group 1130 (e.g., the exemplary reference data sets 1160, 1162, and 1164 in FIG. 11), so as to replace original reference data sets of the baseline data group 1130. The data pattern analysis circuit 115 may perform data pattern analysis again on activity records in the updated baseline data group 1132, and may generate one or more updated reference data sets corresponding to the baseline data group 1132, so as to replace the original reference data sets of the baseline data group 1132. Similarly, the data pattern analysis circuit 115 may perform data pattern analysis again on activity records in the updated baseline data group 1134, and may generate one or more updated reference data sets corresponding to the baseline data group 1134, so as to replace the original reference data sets of the baseline data group 1134.

The data pattern analysis circuit 115 stores the updated related reference data sets in the storage circuit 113, so that the abnormal inspection circuit 116 may utilize those updated reference data sets in subsequent abnormal analysis operations.

As time passes, the data classification circuit 114 would continuously update activity records in all data groups. As a result, the activity records in respective baseline data groups would be updated by the data classification circuit 114 on a rolling basis, so that the activity records in respective baseline data groups are activity records which are generated more recently.

On the other hand, the data pattern analysis circuit 115 continuously updates reference data sets corresponding to respective data groups. As a result, the reference data sets corresponding to respective baseline data groups would be updated by the data pattern analysis circuit 115 on a rolling basis, so that the reference data sets corresponding to respective baseline data groups can reflect the statistical results of target attributes in the activity records which are generated more recently.

From another aspect, each baseline data group and each reference data set corresponding to the baseline data group utilized by the abnormal inspection circuit 116 in subsequent abnormal analysis operations would be adaptively updated into a newer version since the data classification circuit 114 and the data pattern analysis circuit 115 repeat the operation 1020 and the operation 1022.

As can be appreciated from the foregoing descriptions, the data inspection system 110 may determine whether abnormal conditions occur in the operations of a single target IoT device 104 by comparing the content of a single new activity record 1120 with reference data sets corresponding to related baseline data groups. But it is merely an exemplary embodiment, rather than a restriction to the practical implementations. In practice, the data inspection system 110 may analyze the operations of a group of IoT devices having a specific relation at the same time based on contents of multiple activity records.

Figure 12:
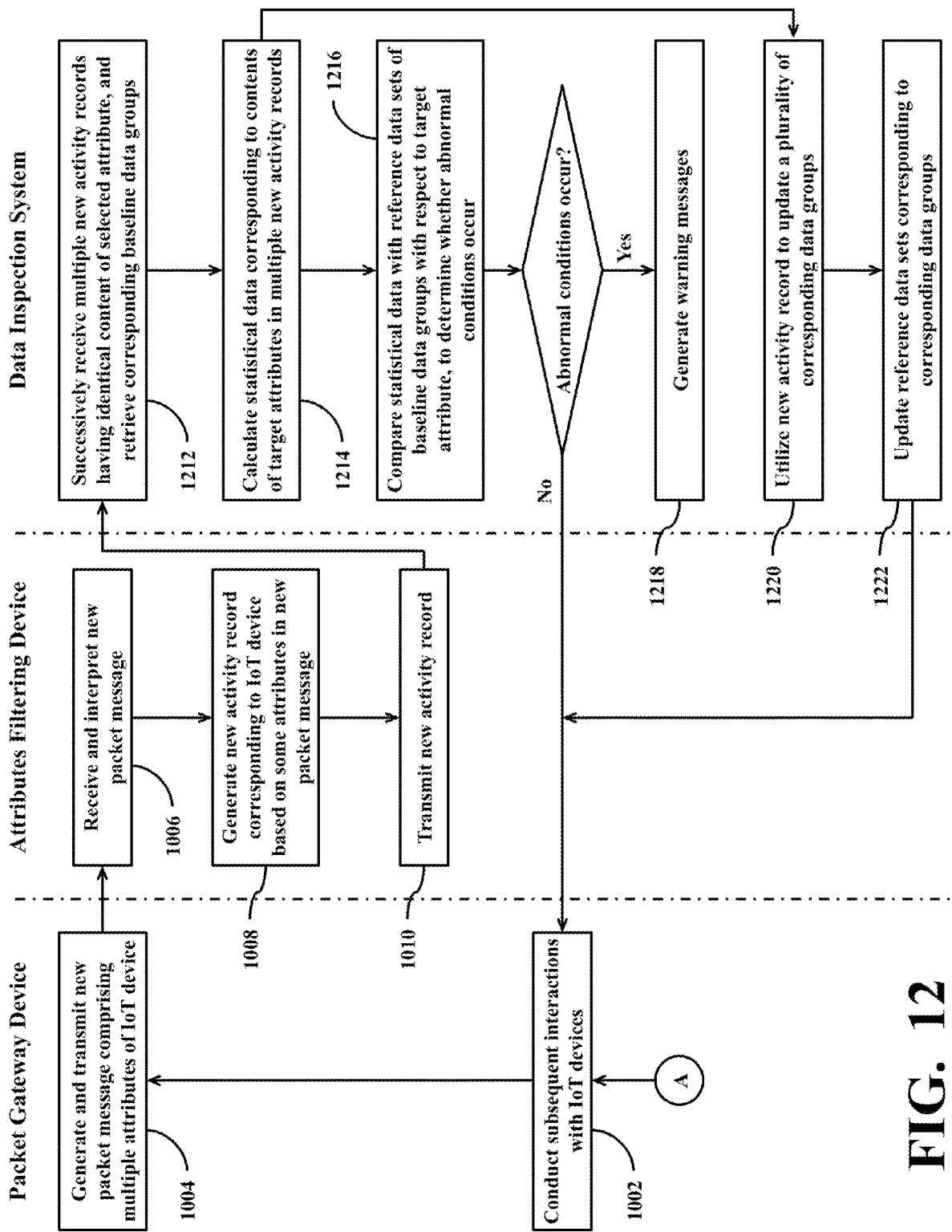
FIG. 12 shows a simplified flowchart of a method for inspecting whether abnormal conditions occur in IoT operations according to another embodiment of the present disclosure.

For example, FIG. 12 shows a simplified flowchart of a method for inspecting whether abnormal conditions occur in IoT operations according to another embodiment of the present disclosure.

In the embodiment of FIG. 12, the operations of individual packet gateway devices and individual attributes filtering devices are the same as the operations in the embodiment in FIG. 10. Therefore, the operation 1002 through the operation 1010 in FIG. 12 are the same as the aforementioned corresponding operations in FIG. 10. For the sake of brevity, those descriptions will not be repeated here.

As described previously, as time passes, the attributes filtering devices 120, 130, and 140 would successively generate many activity records related to different IoT devices in the target IoT systems 101, 102, and 103. Therefore, the data inspection system 110 may perform the operation 1212 of FIG. 12.

In the operation 1212, the communication circuit 111 of the data inspection system 110 successively receives multiple new activity records which have identical content of a selected attribute (e.g., a base station ID, a group ID, a packet gateway ID, and/or a site ID). In this situation, the abnormal inspection circuit 116 may retrieve one or more corresponding baseline data groups from the storage circuit 113 based on the content of the selected attribute by adopting the approach of the aforementioned operation 1014.

In the operation 1214, the abnormal inspection circuit 116 may calculate statistical data corresponding to contents of one or more target attributes (e.g., a device status, an uplink throughput, a downlink throughput, and/or a session time) in the aforementioned multiple new activity records. For example, the abnormal inspection circuit 116 may calculate a statistical result (e.g., a sum, an average, a moving sum, a moving average, or the like) of a specific target attribute in the aforementioned multiple new activity records with respect to a specific statistical period.

Then, the abnormal inspection circuit 116 may perform the operation 1216 to compare the resulting statistical data with reference data sets of one or more baseline data groups with respect to the target attribute, so as to determine whether abnormal conditions occur or not. It is assumed that the aforementioned baseline data group 1130 is the subject to be compared with by the abnormal inspection circuit 116. The abnormal inspection circuit 116 may retrieve a reference data set of the baseline data group 1130 with respect to the target attribute (hereinafter referred to as a baseline data set) from the storage circuit 113. Then, the abnormal inspection circuit 116 may compare the statistical data generated in the operation 1214 with the statistical data of the baseline data set, so as to determine whether the statistical result of the target attribute in multiple new activity records with respect to a specific statistical period apparently deviates the statistical data of the baseline data set with respect to the corresponding statistical period or not.

If the abnormal inspection circuit 116 determines that abnormal conditions occur in the statistical data of the aforementioned multiple new activity records, then the abnormal inspection circuit 116 performs the operation 1218 to generate one or more warning messages related to multiple IoT devices or target IoT systems corresponding to the aforementioned multiple new activity records. Similarly, the user graphical interface generating circuit 117 displays the warning messages generated by the abnormal inspection circuit 116 for the relevant user, such as an operator, an administrator, an auditor and/or other user of related IoT system, by using appropriate visual approaches.

For example, it is assumed that the target IoT system 101 is a smart street light system, and the multiple IoT devices 104 in the target IoT system 101 are multiple smart street lights respectively arranged at different sites. If the data inspection system 110 needs to determine whether the operations of multiple smart street lights (i.e., multiple IoT devices 104) within a specific target site (hereinafter referred to as a first target site and it is assumed its site ID is ST-ID1) in the target IoT system 101 are normal or not, then the communication circuit 111 may successively receive multiple new activity records, whose content of the site ID is ST-ID1, generated by related attributes filtering devices in the aforementioned operation 1212.

For the convenience of description, it is assumed hereinafter that three reference data sets corresponding to baseline data groups of the first target site with respect to the session time, the "Stop" status, and the uplink throughput are respectively referred to as a reference data set R1, a reference data set R2, and a reference data set R3. In normal situations, the smart street lights within the first target site stay in the "turn-on" status from 6 PM to 6 AM the next day. Therefore, the statistic graphs respectively corresponding to the reference data set R1, the reference data set R2, and the reference data set R3 would be respectively similar to the statistic graphs 810, 820, and 830 illustrated in the aforementioned FIG. 8.

As described previously, the abnormal inspection circuit 116 may calculate statistical data corresponding to contents of respective device status in multiple new activity records received by the communication circuit 111 in the operation 1214, and may compare the resulting statistical data with the reference data set of the baseline data group with respect to the device status in the operation 1216.

If errors occur when the aforementioned smart street light system conducts large scale software update on IoT devices, and resulting in that multiple smart street lights within the first target site cannot operate normally, then those smart street lights may continuously try to connect to a back-end server and resulting in that the contents of the device status recorded in many new activity records, whose site ID is ST-ID1, show "Start" or "Stop". As a result, the statistical data generated by the abnormal inspection circuit 116 in the operation 1214 would show a phenomenon that a quantity of activity records, whose content of the device status is "Stop", increases significantly in a short period of time.

Since such situation is significantly different from the data pattern presented by the reference data set R2 (e.g., the statistic graph 820 illustrated in FIG. 8), the abnormal inspection circuit 116 then may determine that abnormal conditions occur in the operations of multiple smart street lights within the first target site, and may generate related warning messages.

For another example, it is assumed that the target IoT system 102 is a smart electricity meter system, and the multiple IoT devices 105 in the target IoT system 102 are multiple smart electricity meters respectively arranged at different sites. If the data inspection system 110 needs to determine whether the operations of multiple smart electricity meters (i.e., multiple IoT devices 105) within a specific target site (hereinafter referred to as a second target site and it is assumed its site ID is ST-ID2) in the target IoT system 102 are normal or not, then the communication circuit 111 may successively receive multiple new activity records, whose content of the site ID is ST-ID2, generated by related attributes filtering devices in the aforementioned operation 1212.

For the convenience of description, it is assumed hereinafter that three reference data sets corresponding to baseline data groups of the second target site with respect to the "Alive" status, the "Stop" status, and the uplink throughput are respectively referred to as a reference data set R4, a reference data set R5, and a reference data set R6. In normal situations, the smart electricity meters within the second target site are connected to power sources, so the smart electricity meters normally stay in the "Alive" status the entire day, and rarely enter the "Stop" status during the operations. Therefore, the statistic graphs respectively corresponding to the reference data set R4, the reference data set R5, and the reference data set R6 would be respectively similar to the statistic graphs 910, 920, and 930 illustrated in the aforementioned FIG. 9.

As described previously, the abnormal inspection circuit 116 may calculate statistical data corresponding to contents of respective device status in multiple new activity records received by the communication circuit 111 in the operation 1214, and may compare the resulting statistical data with the reference data set of the baseline data group with respect to the device status in the operation 1216.

If problems occur in the network environment of the aforementioned second target site, and it causes the multiple smart electricity meters within the second target site cannot successfully transmit data to a back-end server, then these smart electricity meters may continuously try to connect to the back-end server. This situation may result in that the contents of the device status recorded in many new activity records, whose content of the site ID is ST-ID2, rarely show "Alive", and that respective uplink throughputs recorded in many new activity records, whose content of the site ID is ST-ID2, is very low. As a result, the statistical data generated by the abnormal inspection circuit 116 in the operation 1214 would show a phenomenon that a quantity of activity records, whose content of the device status is "Alive", decreases significantly in a short period of time, and that respective uplink throughputs recorded in activity records drops significantly in a short period of time.

Since such situation is significantly different from the data pattern presented by the reference data sets R4 and R6 (e.g., the statistic graphs 910 and 930 illustrated in FIG. 9), the abnormal inspection circuit 116 then may determine that abnormal conditions occur in the operations of multiple smart electricity meters within the second target site, and may generate related warning messages.

For another example, it is assumed that the target IoT system 103 is a traffic signal management system, and the multiple IoT devices 106 in the target IoT system 103 are multiple traffic signal monitoring circuits respectively arranged at different sites. If the data inspection system 110 needs to determine whether the operations of multiple traffic signal monitoring circuits (i.e., multiple IoT devices 106) within a specific target site (hereinafter referred to as a third target site and it is assumed its site ID is ST-ID3) in the target IoT system 103 are normal or not, then the communication circuit 111 may successively receive multiple new activity records, whose content of the site ID is ST-ID3, generated by related attributes filtering devices in the aforementioned operation 1212.

For the convenience of description, it is assumed hereinafter that three reference data sets corresponding to baseline data groups of the third target site with respect to the "Alive" status, the "Start" status, and the downlink throughput are respectively referred to as a reference data set R7, a reference data set R8, and a reference data set R9. In normal situations, the traffic signal monitoring circuits within the third target site are connected to power sources, so the smart electricity meters normally stay in the "Alive" status the entire day, and rarely enter the "Start" status or "Stop" status during the operations. Therefore, the statistic graphs respectively corresponding to the reference data set R7, the reference data set R8, and the reference data set R9 would be respectively similar to the statistic graphs 710, 720, and 730 illustrated in the aforementioned FIG. 7.

As described previously, the abnormal inspection circuit 116 may calculate statistical data corresponding to contents of respective device status in multiple new activity records received by the communication circuit 111 in the operation 1214, and may compare the resulting statistical data with the reference data set of the baseline data group with respect to the device status in the operation 1216.

If errors occur in the power supply near the aforementioned third target site, and it causes that multiple traffic signal monitoring circuits within the third target site cannot stay in the "Alive" status, then these traffic signal monitoring circuits may continuously restart and try to connect to a back-end server. This situation may result in that the contents of the device status recorded in many new activity records, whose content of the site ID is ST-ID3, rarely show "Alive" status, and frequently show "Start" status or "Stop" status. As a result, the statistical data generated by the abnormal inspection circuit 116 in the operation 1214 would show a phenomenon that a quantity of activity records, whose content of the device status is "Alive", decreases significantly in a short period of time, while a quantity of activity records, whose content of the device status is "Start", increases significantly in that short period of time.

Since such situation is significantly different from the data pattern presented by the reference data sets R7 and R8 (e.g., the statistic graphs 710 and 720 illustrated in FIG. 7), the abnormal inspection circuit 116 then may determine that abnormal conditions occur in the operations of multiple traffic signal monitoring circuits within the third target site, and may generate related warning messages.

On the other hand, after the abnormal inspection circuit 116 calculates the statistical data corresponding to contents of the target attributes in the multiple new activity records in the aforementioned operation 1214, the data classification circuit 114 further performs the operation 1220 of FIG. 12, and the data pattern analysis circuit 115 further performs the operation 1222 of FIG. 12.

In the operation 1220, the data classification circuit 114 may utilize the aforementioned multiple new activity records to update contents of a plurality of corresponding data groups by adopting the approach of the aforementioned operation 1020. The data classification circuit 114 may adopt the approach of the aforementioned operation 216 to classify each new activity record based on contents of multiple attributes which can be utilized as classification basis, and to retrieve a plurality of data groups corresponding to the respective new activity records, and may add the new activity record into individual data groups, and may at the same time remove the oldest activity record in the individual data groups. In addition, the data classification circuit 114 may store corresponding updated data groups in the storage circuit 113, so that the abnormal inspection circuit 116 may utilize those updated data groups in subsequent abnormal analysis operations.

In the operation 1222, the data pattern analysis circuit 115 may update multiple reference data sets corresponding to the corresponding data groups of respective new activity records. The data pattern analysis circuit 115 may adopt the approach of the aforementioned operation 1020 to perform data pattern analysis again on activity records in respective data groups into which the new activity record is added, and may update one or more reference data sets corresponding to the respective data groups. Similarly, the data pattern analysis circuit 115 may store the updated related reference data sets in the storage circuit 113, so that the abnormal inspection circuit 116 may utilize those updated reference data sets in subsequent abnormal analysis operations.

Same as the aforementioned embodiment in FIG. 10, the data classification circuit 114 would continuously update activity records in all data groups as time passes, and the data pattern analysis circuit 115 would continuously update reference data sets corresponding to respective data groups.

As a result, the activity records in respective baseline data groups would be updated by the data classification circuit 114 on a rolling basis, so that the activity records in respective baseline data groups are activity records which are generated more recently.

On the other hand, the reference data sets corresponding to respective baseline data groups would be updated by the data pattern analysis circuit 115 on a rolling basis, so that the reference data sets corresponding to respective baseline data groups can reflect the statistical results of target attributes in the activity records which are generated more recently.

As a result, each baseline data group and each reference data set corresponding to the baseline data group utilized by the abnormal inspection circuit 116 in subsequent abnormal analysis operations would be adaptively updated into a newer version since the data classification circuit 114 and the data pattern analysis circuit 115 repeat the operation 1220 and the operation 1222.

As can be appreciated from the foregoing descriptions, utilizing the data classification circuit 114 to classify multiple activity records corresponding to multiple IoT devices based on contents of multiple attributes to form different data groups can significantly reduce the computing loading and complexity required by the data pattern analysis circuit 115 for conducting subsequent analysis on the data pattern of the activity records in respective data groups, and also improve the analysis speed of the data pattern.

In addition, classifying numerous activity records into different data groups can significantly reduce the computing loading required by the abnormal inspection circuit 116 for conducting subsequent abnormal inspection, which is beneficial in improving the efficiency and speed of abnormal inspection.

As is well known in related art, the quantity of IoT devices in mIoT applications is usually massive, thus it usually requires enormous resources to monitor these IoT devices. If seeking to check whether abnormal conditions occur in each IoT device at any time, the required data transmission bandwidth and the demand for analysis resources will be unrealistically high. Moreover, when the quantity of IoT devices reaches a certain level, even if the system has the capability to monitor the operation status of each IoT terminal device in real time, it would generate a massive quantity of warning messages, which would cause the system's monitoring personnel to be bombarded by huge amount of information, and make it difficult for the monitoring personnel to quickly analyze and diagnose which part of the system is faulty.

The aforementioned attributes filtering devices 120, 130, and 140 conduct initial filtering on attributes in numerous packet messages generated by the packet gateway devices 150, 160, and 170, so that the data amount which needs to be processed by the data inspection system 110 can be effectively reduced, which is beneficial in improving the overall operating performance of the data inspection system 110.

Since the aforementioned data inspection system 110 is enabled to automatically classify a massive quantity of activity records based on different classification basis, and to perform comparison analysis based on different analysis basis, the problem source in the mIoT applications can be quickly located.

In addition, the data classification circuit 114 and the data pattern analysis circuit 115 would continuously update each baseline data group and each reference data set corresponding to the baseline data group utilized by the abnormal inspection circuit 116 in subsequent abnormal analysis operations on a rolling basis. As a result, each baseline data group and each reference data set corresponding to the baseline data group utilized by the abnormal inspection circuit 116 in conducting abnormal analysis operations would be adaptively updated as time passes, thus significantly reducing the trouble of manual intervention to adjust related parameters or comparison basis.

According to the research in the cognitive science, human beings have higher efficiency in understanding visualized information than understanding information presented in the form of pure texts. Since the data inspection system 110 can present the results of abnormal analysis in a straightforward visualized manner to related users, it is beneficial in significantly reducing the time required by the users in analyzing the root cause of abnormal conditions, thereby effectively improving the efficiency in diagnosing the root cause of the problems in the target IoT system.

Furthermore, since the data inspection system 110 is enabled to perform abnormal analysis operations from different aspects and to cross compare the analysis results, it can correctly clarify the attribution of responsibility when abnormal conditions occur in the IoT application, thereby greatly reducing the possibility of disputes between different partners who jointly construct various IoT applications.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A data inspection system (110) of an IoT operations monitoring system (100), for inspecting operating situations of multiple IoT devices (104, 105, 106) in a plurality of target IoT systems (101, 102, 103), the data inspection system (110) comprising:
   a communication circuit (111), arranged to operably communicate data with a plurality of attributes filtering devices (120, 130, 140) through networks to receive multiple activity records (320, 322, 324, 326) corresponding to the multiple IoT devices (104, 105, 106) and generated by the plurality of attributes filtering devices (120, 130, 140);
   a storage circuit (113), arranged to operably store the multiple activity records (320, 322, 324, 326) received by the communication circuit (111);
   a data classification circuit (114), coupled with the storage circuit (113), and arranged to operably classify each of the multiple activity records (320, 322, 324, 326) based on contents of N attributes to form M data groups (330, 332, 334), and to operably store the M data groups (330, 332, 334) in the storage circuit (113), wherein N is 2 or an integer greater than 2, while M is at least two times of N
   a data pattern analysis circuit (115), coupled with the storage circuit (113), and arranged to operably analyze a data pattern of a plurality of activity records in respective data group (330) with respect to a data collection period, so as to generate one or more reference data sets (340, 342, 344) corresponding to the respective data group (330), and to operably store the one or more reference data sets (340, 342, 344) in the storage circuit (113); and
   an abnormal inspection circuit (116), coupled with the storage circuit (113);
   wherein after the data collection period, the communication circuit (111) further receives a new activity record (1120) generated by the plurality of attributes filtering devices (120, 130, 140) and corresponding to a target IoT device (104) of the multiple IoT devices (104, 105, 106);
   wherein the abnormal inspection circuit (116) is arranged to operably compare contents of one or more target attributes (1113) in the new activity record (1120) with one or more reference data sets (1140, 1142, 1144) of a corresponding data group (1130) with respect to the one or more selected attributes, so as to determine whether abnormal conditions occur;
   wherein if the abnormal inspection circuit (116) determines that abnormal conditions occur, then the abnormal inspection circuit (116) generates one or more corresponding warning messages.

2. The data inspection system (110) of claim 1, wherein operations of generating the one or more reference data sets (340, 342, 344) corresponding to the respective data group conducted by the data pattern analysis circuit (115) comprise:
   selecting one of the M data groups to be a current data group;
   analyzing a change pattern of contents of a first target attribute in a plurality of activity records in the current data group with respect to multiple different statistical periods within the data collection period so as to generate a first reference data set with respect to the first target attribute of the current data group; and
   analyzing a change pattern of contents of a second target attribute in the plurality of activity records in the current data group with respect to multiple different statistical periods within the data collection period so as to generate a second reference data set with respect to the second target attribute of the current data group.

3. The data inspection system (110) of claim 2, wherein the content of the first target attribute is an uplink throughput of a corresponding IoT device, a downlink throughput of the corresponding IoT device, a status of the corresponding IoT device, or a session time of the corresponding IoT device.

4. The data inspection system (110) of claim 3, wherein the first reference data set is utilized to present one of following analyzing results of the plurality of activity records in the current data group:
   a change of a sum or a moving sum of a quantity of activity records, whose device status having a specific content, with respect to multiple different statistical periods within the data collection period;
   a change of a sum, an average, a moving sum, or a moving average of the downlink throughput recorded in the plurality of activity records with respect to multiple different statistical periods within the data collection period;
   a change of a sum, an average, a moving sum, or a moving average of the uplink throughput recorded in the plurality of activity records with respect to multiple different statistical periods within the data collection period; and
   a change of a sum, an average, a moving sum, or a moving average of the session time recorded in the plurality of activity records with respect to multiple different statistical periods within the data collection period.

5. The data inspection system (110) of claim 1, wherein operations of classifying the multiple activity records (320, 322, 324, 326) conducted by the data classification circuit (114) comprise:
- selecting one of the multiple activity records (320, 322, 324, 326) to be a current activity record;
- selecting one of multiple attributes in the current activity record to be a first selected attribute;
- if there currently exists no data group corresponding to a content of the first selected attribute, creating a first data group corresponding to the content of the first selected attribute;
- classifying the current activity record into the first data group;
- selecting another attribute in the current activity record to be a second selected attribute;
- if there currently exists no data group corresponding to a content of the second selected attribute, creating a second data group corresponding to the content of the second selected attribute; and
- classifying the current activity record into the second data group.

6. The data inspection system (110) of claim 1, wherein operations of classifying the multiple activity records (320, 322, 324, 326) conducted by the data classification circuit (114) comprise:
- selecting one of the N attributes to be a first selected attribute;
- generating corresponding multiple first attribute data groups based on different contents of the first selected attribute, and classifying the multiple activity records (320, 322, 324, 326) into the multiple first attribute data groups to ensure the contents of the first selected attribute in all activity records in the same first attribute data group are identical;
- selecting another attribute from the N attributes to be a second selected attribute; and
- generating corresponding multiple second attribute data groups based on different contents of the second selected attribute, and classifying the multiple activity records (320, 322, 324, 326) into the multiple second attribute data groups to ensure the contents of the second selected attribute in all activity records in the same second attribute data group are identical.

7. The data inspection system (110) of claim 1, wherein the data classification circuit (114) is further arranged to operably classify the new activity record (1120) based on contents of the N attributes, so as to utilize the new activity record (1120) to update a plurality of corresponding data groups (1130, 1132, 1134).

8. The data inspection system (110) of claim 7, wherein the data pattern analysis circuit (115) is further arranged to operably update a plurality of reference data sets (1160, 1162, 1164) corresponding to the plurality of corresponding data groups (1130, 1132, 1134).

* * * * *